United States Patent
Park et al.

(10) Patent No.: US 10,528,248 B2
(45) Date of Patent: Jan. 7, 2020

(54) METHOD FOR PROVIDING USER INTERFACE AND ELECTRONIC DEVICE THEREFOR

(71) Applicant: Samsung Electronics Co., Ltd., Gyeonggi-do (KR)

(72) Inventors: Sung-Joon Park, Gyeongsangbuk-do (KR); Chul-Hyung Yang, Gyeongsangbuk-do (KR)

(73) Assignee: Samsung Electronics Co., Ltd. (KR)

( * ) Notice: Subject to any disclaimer, the term of this patent is extended or adjusted under 35 U.S.C. 154(b) by 220 days.

(21) Appl. No.: 15/087,155

(22) Filed: Mar. 31, 2016

(65) Prior Publication Data
US 2016/0291857 A1 Oct. 6, 2016

(30) Foreign Application Priority Data

Mar. 31, 2015 (KR) .................. 10-2015-0045436

(51) Int. Cl.
*G06F 3/0488* (2013.01)
*G06F 3/0486* (2013.01)

(52) U.S. Cl.
CPC .......... *G06F 3/0488* (2013.01); *G06F 3/0486* (2013.01)

(58) Field of Classification Search
CPC ..... G06F 3/0484; G06F 3/0488; G06F 3/0486
See application file for complete search history.

(56) References Cited

U.S. PATENT DOCUMENTS

| | | | |
|---|---|---|---|
| 2009/0093276 A1* | 4/2009 | Kim ...................... | G06F 3/0482 455/566 |
| 2009/0239588 A1 | 9/2009 | Nam | |
| 2011/0075031 A1* | 3/2011 | Jung ...................... | H04N 5/45 348/565 |
| 2014/0111451 A1 | 4/2014 | Park et al. | |
| 2014/0118268 A1* | 5/2014 | Kuscher ................ | G06F 3/0488 345/173 |
| 2015/0062069 A1* | 3/2015 | Shin ...................... | G06F 3/044 345/174 |
| 2015/0067515 A1* | 3/2015 | Chang ................... | G06F 3/0481 715/728 |

FOREIGN PATENT DOCUMENTS

| | | |
|---|---|---|
| KR | 10-2009-0076125 | 7/2009 |
| KR | 10-2009-0100933 | 9/2009 |
| KR | 10-1250821 | 4/2013 |

* cited by examiner

*Primary Examiner* — Sherrod L Keaton
(74) *Attorney, Agent, or Firm* — The Farrell Law Firm, P.C.

(57) ABSTRACT

According to an embodiment of the present disclosure, a method and an electronic device for receiving a user input by the electronic device is provided. The method includes receiving a first touch input on a touchscreen, detecting at least part of a region contacted by the first touch input on the touchscreen, a region adjacent to the contacted region, and a position adjacent to the contacted region, after receiving the first touch input, and displaying a user interface on the touchscreen at least partially based on a relative relation between the region contacted by the first touch input, and at least one of the adjacent region and the adjacent position.

9 Claims, 14 Drawing Sheets

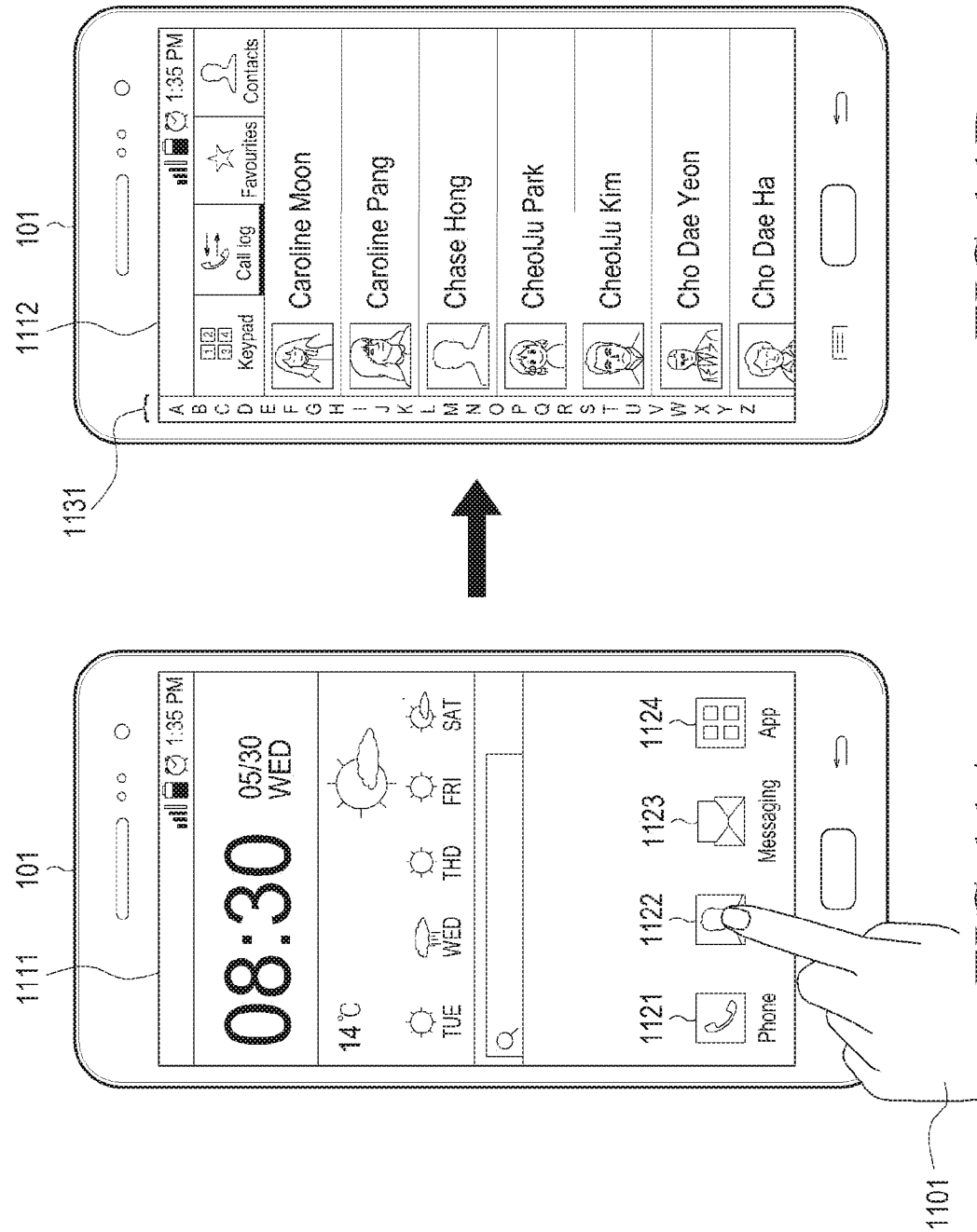

METHOD FOR PROVIDING USER INTERFACE AND ELECTRONIC DEVICE THEREFOR

PRIORITY

This application claims priority under 35 U.S.C. § 119(a) to a Korean Patent Application filed in the Korean Intellectual Property Office on Mar. 31, 2015, and assigned Serial No. 10-2015-0045436, the entire disclosure of which is incorporated herein by reference.

BACKGROUND

1. Field of the Disclosure

The present disclosure relates generally to electronic devices, and more specifically, to methods for inputting user inputs to electronic devices.

2. Description of the Related Art

Conventional touchscreen entry systems recognize the coordinates of touches on the screen. An electronic device may add a temporal parameter to a touch to implement a long touch, a double touch or multi-touch, such as a pinch-to-zoom, as well as a simple touch. Emerging user interfaces (UIs) or user experiences (UXs) are often combined with a camera, an acceleration sensor, or other types of hardware to grasp a user's patterns. Some UXs enable single-hand touch manipulation for users who favor large-screen electronic devices for comfortable view.

FIG. 1A and FIG. 1B illustrate a method of manipulating an electronic device in a single-hand manipulation mode.

Referring to FIGS. 1A and 1B, an electronic device 10 is provided. The electronic device 10 displays a standby screen 30 on a touchscreen 20 of the electronic device 10. A user 50 may change the position of the screen 30, by entering a user input onto the touchscreen 20 to shift the location of the standby screen 30. For example, the user 50 may shift the standby screen 30 to the right by dragging the standby screen 30 to the right, as shown in FIG. 1B.

FIG. 2A and FIG. 2B illustrate a method for manipulating an electronic device in a single-hand manipulation mode.

Referring to FIGS. 2A and 2B, an electronic device 10 is provided. The electronic device 10 displays a keypad 40 on the touchscreen 20 of the electronic device 10. The user 50 may change the position of the keypad 40 by pressing a virtual button. For example, the user 50 may press a virtual button 41 on a right side of the keypad 40 as a user input to move the keypad 40 to the right, as shown in FIG. 2B. A virtual button 42 for moving the keypad 40 back to the left, is shown in FIG. 2B.

However, such a scheme of touch recognition has a limitation in providing additional interfaces to the user because it adopts only coordinates of the touch. In particular, the "single-hand manipulation mode" as shown in FIGS. 1A, 1B, 2A and 2B require the user to make settings as to the direction of the display of a UI displayed on the touchscreen, such as the virtual keypad, by pushing the UI to the left or right to change the location of the UI. Further, conventional UIs primarily designed for right-handed users may cause the user to feel uncomfortable when attempting to manipulate the electronic device with his left hand because the touchscreen may be hidden by the left hand.

SUMMARY

The present disclosure has been made to address at least the problems and disadvantages described above, and to provide at least the advantages described below.

Accordingly, an aspect of the present disclosure is to provide a method and an electronic device for displaying on a touchscreen a user interface that enables the user to manipulate the electronic device in a more comfortable manner depending on a relative relation between the position of a touch input made by the user on the touchscreen, a region adjacent to the touch input, position adjacent to the touch input.

In accordance with an aspect of the present disclosure, a method for receiving a user input by an electronic device is provided. The method includes receiving a first touch input on a touchscreen, detecting at least one of a region contacted by the first touch input on the touchscreen, a region adjacent to the contacted region, and a position adjacent to the contacted region, after receiving the first touch input, and displaying a user interface on the touchscreen at least partially based on a relative relation between at least one of the region contacted by the first touch input, the adjacent region, and the adjacent position In accordance with another aspect of the present disclosure, a method for receiving a user input by an electronic device is provided. The method includes detecting at least one of a region and a position adjacent to where a portion of a user's body or an object is positioned adjacent to a touchscreen, detecting a touch input on the touchscreen by the user's body portion or the object after detecting at least one of the adjacent region and the adjacent position, and displaying a user interface on the touchscreen at least partially based on a relative relation between the touch input and the at least one of the adjacent region and the adjacent position.

In accordance with another aspect of the present disclosure, an electronic device for receiving a user input is provided. The electronic device includes a display, including a touchscreen, that receives a first touch input on the touchscreen, and a processor that detects at least one of a region contacted by the first touch input on the touchscreen, a region adjacent to the contacted region, and a position adjacent to the contacted region, after receiving the first touch input, and controls the display to display a user interface on the touchscreen at least partially based on a relative relation between at least one of the region contacted by the first touch input, the adjacent region, and the adjacent position.

According to an embodiment of the present disclosure, an electronic device for receiving a user input is provided. The electronic device includes a display, including a touchscreen, that receives a first touch input on the touchscreen, and a processor that detects at least one of a region contacted by the first touch input on the touchscreen, a region adjacent to the contacted region, and a position adjacent to the contacted region, before receiving the first touch input, and controls the display to display a user interface on the touchscreen at least partially based on a relative relation between at least one of the region contacted by the first touch input, the adjacent region, and the adjacent position.

BRIEF DESCRIPTION OF THE DRAWINGS

The above and other aspect, features, and advantages of the present disclosure will be more apparent from the following detailed description taken in conjunction with the accompanying drawing, in which:

FIGS. 11A and 11B illustrate a method of an electronic device for displaying a user interface, according to an embodiment of the present disclosure;

DETAILED DESCRIPTION OF EMBODIMENTS OF THE PRESENT DISCLOSURE

Figure 1:
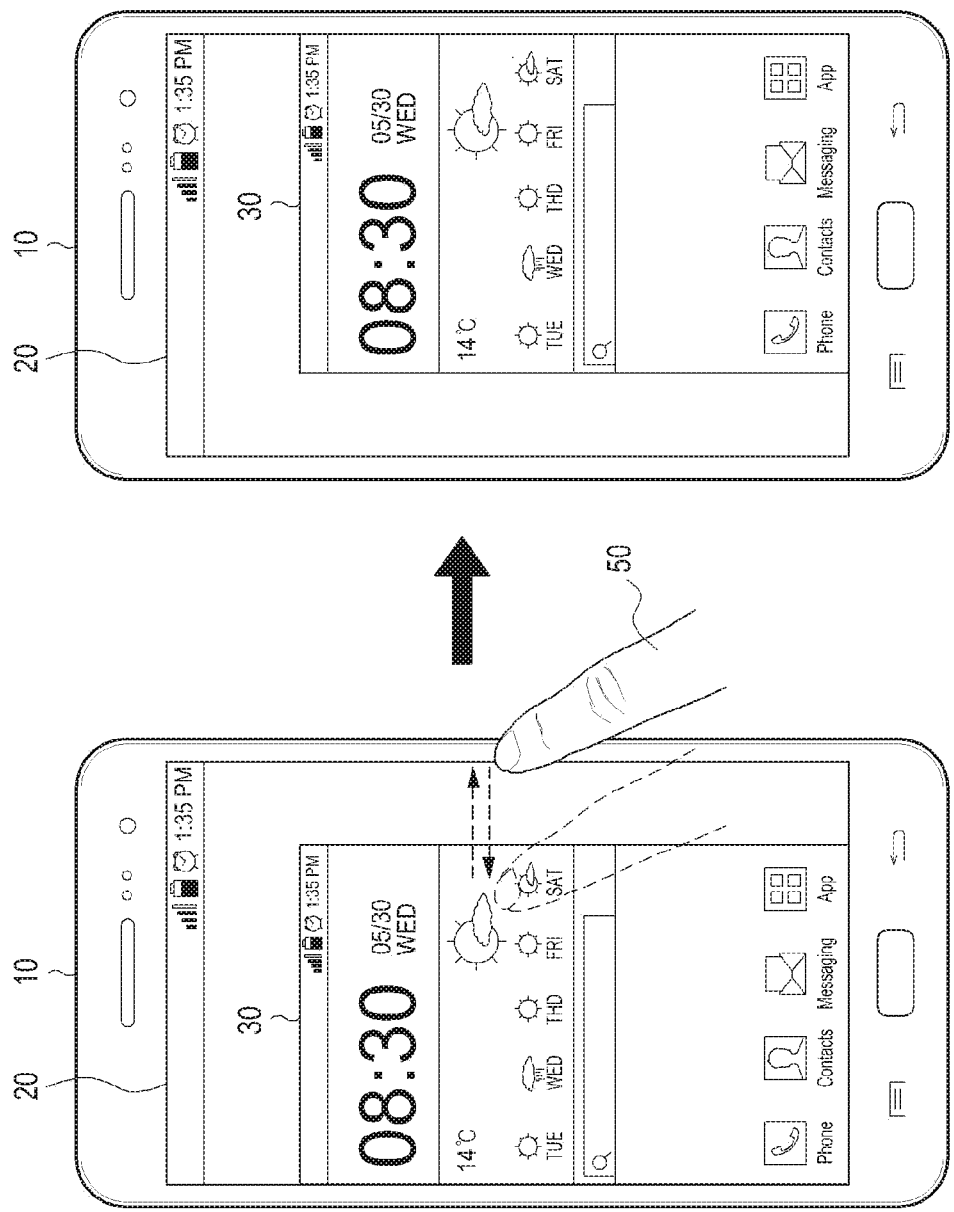
FIGS. 1A and 1B illustrate a method of manipulating an electronic device in a single-hand manipulation mode.
Figure 2:
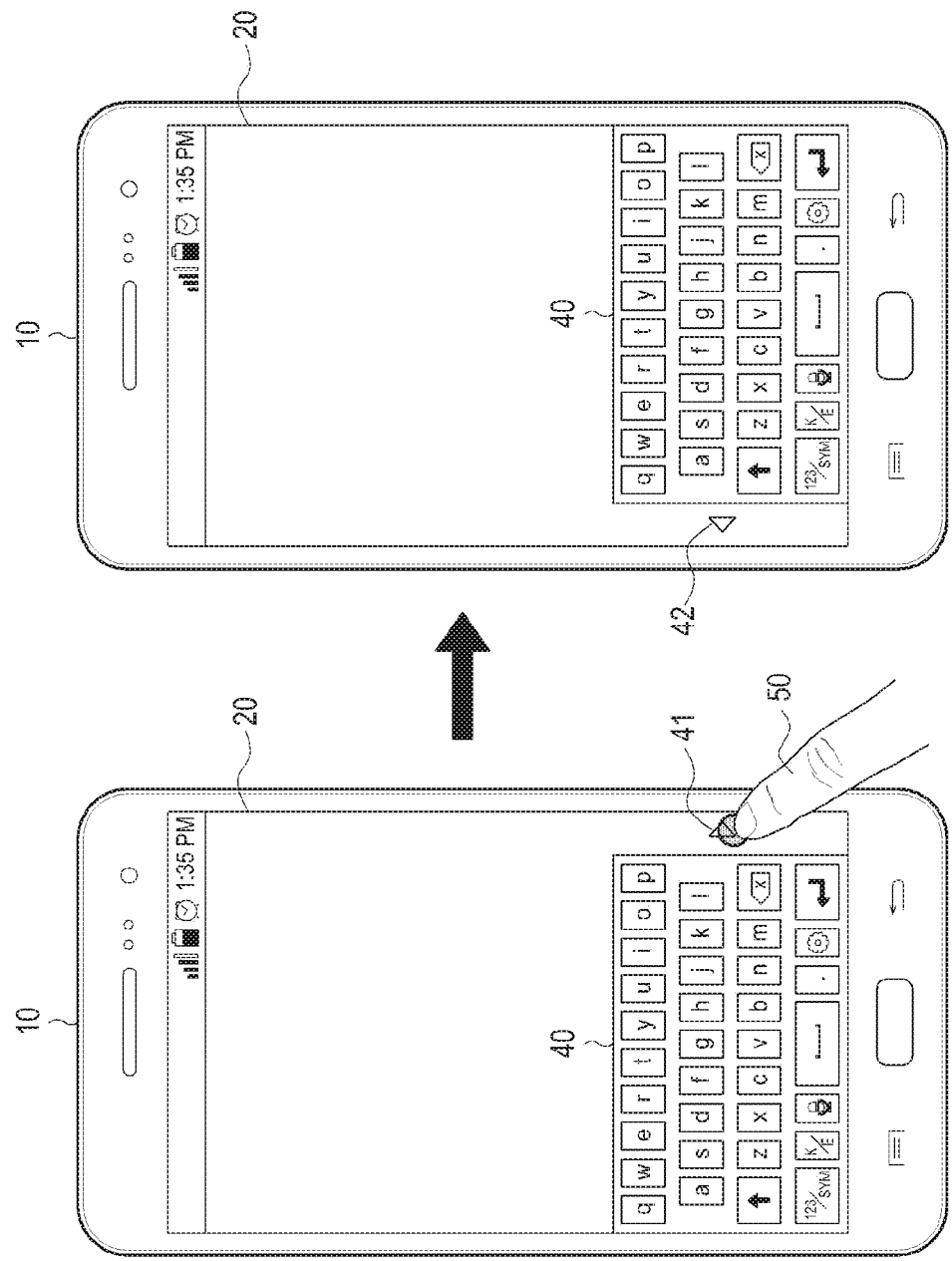
FIGS. 2A and 2B illustrate a method of manipulating an electronic device in a single-hand manipulation mode.

Hereinafter, embodiments of the present disclosure are described with reference to the accompanying drawings. However, it should be appreciated that the present disclosure is not limited to the embodiments described herein, and all changes, equivalents, and/or modifications thereto also belong to the scope of the present disclosure. The same or similar reference numerals may be used to refer to the same or similar elements throughout the specification and the drawings.

As used herein, the terms "have," "may have," "include," and "may include" indicate the existence of the feature (e.g., a number, function, operation, or a component such as a part) and do not exclude the existence of other features.

As used herein, the terms "A or B," "at least one of A and/or B," and "one or more of A and/or B" may include all possible combinations of A and B. For example, "A or B," "at least one of A and B," "at least one of A or B" may indicate all of (1) A, (2) B, or (3) A and B.

As used herein, the terms "first" and "second" may modify various components regardless of importance and do not limit the components. These terms are only used to distinguish one component from another. For example, a first user device and a second user device may indicate different user devices from each other regardless of the order or importance of the devices. For example, a first component may be referred to as a second component, and vice versa without departing from the scope of the present disclosure.

It will be understood that when an element (e.g., a first element) is referred to as being (operatively or communicatively) "coupled with/to," or "connected with/to" another element (e.g., a second element), the first element can be coupled or connected with/to the second element directly or via a third element. In contrast, it will be understood that when an element (e.g., a first element) is referred to as being "directly coupled with/to" or "directly connected with/to" another element (e.g., a second element), no other element (e.g., a third element) intervenes between the first element and the second element.

As used herein, the terms "configured to" and "set to" may be interchangeably used with the terms "suitable for," "having the capacity to," "designed to," "adapted to," "made to," or "capable of" depending on circumstances. The term "configured (or set) to" does not essentially mean "specifically designed in hardware to." Rather, the term "configured (or set) to" may refer to a device can perform an operation together with another device or parts. For example, the term "processor configured (or set) to perform A, B, and C" may refer to a generic-purpose processor (e.g., a CPU or application processor) that may perform the operations by executing one or more software programs stored in a memory device or a dedicated processor (e.g., an embedded processor) for performing the operations.

The terms as used herein are provided merely to describe some embodiments thereof, but not to limit the scope of other embodiments of the present disclosure. It is to be understood that the singular forms "a," "an," and "the" include plural references unless the context clearly dictates otherwise. All terms, including technical and scientific terms, used herein have the same meanings as commonly understood by one of ordinary skill in the art to which the embodiments of the present disclosure belong. It will be further understood that terms, such as those defined in commonly used dictionaries, should be interpreted as having a meaning that is consistent with their meanings in the context of the relevant art and should not be interpreted in an idealized or overly formal sense unless expressly so defined herein. In some cases, the terms defined herein should not be interpreted to exclude embodiments of the present disclosure.

An electronic device, according to an embodiment of the present disclosure, may include at least one of a smartphone, a tablet personal computer (PC), a mobile phone, a video phone, an e-book reader, a desktop PC, a laptop computer, a netbook computer, a workstation, a personal digital assistant (PDA), a portable multimedia player (PMP), an MP3 player, a mobile medical device, a camera, or a wearable device (e.g., smart glasses, a head-mounted device (HIVID), electronic clothes, an electronic bracelet, an electronic necklace, an electronic appcessory, an electronic tattoo, a smart mirror, or a smart watch).

According to an embodiment of the present disclosure, the electronic device may be a smart home appliance. For example, the smart home appliance may include at least one of a television, a digital versatile disk (DVD) player, an audio player, a refrigerator, an air conditioner, a cleaner, an oven, a microwave oven, a washer, a drier, an air cleaner, a set-top box, a home automation control panel, a security control panel, a TV box (e.g., Samsung HomeSync™, Apple TV™, or Google TV™), a gaming console (Xbox™, PlayStation™), an electronic dictionary, an electronic key, a camcorder, or an electronic picture frame.

According to an embodiment of the present disclosure, the electronic device may include at least one of various medical devices (e.g., diverse portable medical measuring devices (a blood sugar measuring device, a heartbeat measuring device, or a body temperature measuring device), a magnetic resource angiography (MRA) device, a magnetic resource imaging (MRI) device, a computed tomography (CT) device, an imaging device, or an ultrasonic device), a navigation device, a global positioning system (GPS) receiver, an event data recorder (EDR), a flight data recorder (FDR), an automotive infotainment device, an sailing electronic device (e.g., a sailing navigation device or a gyro compass), avionics, security devices, vehicular head units, industrial or home robots, automatic teller's machines (ATMs), point of sales (POS) devices, or Internet of Things (IoT) devices (e.g., a lightbulb, various sensors, an electric or gas meter, a sprinkler, a fire alarm, a thermostat, a street light, a toaster, fitness equipment, a hot water tank, a heater, or a boiler).

According to an embodiment of the disclosure, examples of the electronic device may be at least one of part of furniture or building/structure, an electronic board, an electronic signature receiving device, a projector, or various measurement devices (e.g., devices for measuring water, electricity, gas, or electromagnetic waves).

According to an embodiment of the present disclosure, the electronic device may be one or a combination of the above-listed devices. The electronic device may be a flexible electronic device. The electronic device disclosed herein is not limited to the above-listed devices, and may include new electronic devices depending on the development of technology.

Hereinafter, electronic devices are described with reference to the accompanying drawings, according to various embodiments of the present disclosure. As used herein, the term "user" may denote a human or another device (e.g., an artificial intelligence electronic device) using the electronic device.

Figure 3:
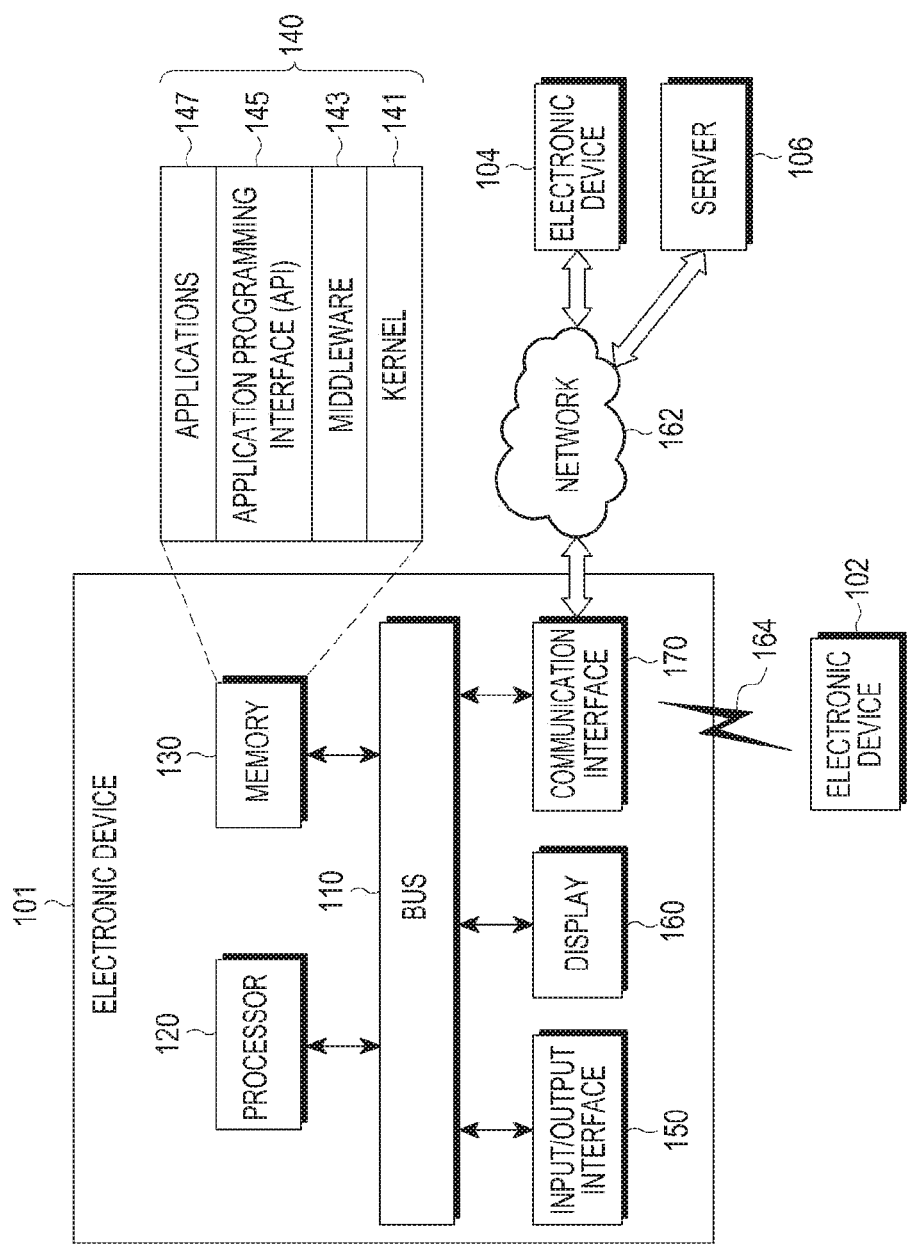
FIG. 3 is a configuration of a network environment including an electronic device, according to an embodiment of the present disclosure.

FIG. 3 is a configuration of a network environment including an electronic device, according to an embodiment of the present disclosure.

Referring to FIG. 3, an electronic device 101 is provided. The electronic device 101 includes a bus 110, a processor 120, a memory 130, an input/output interface 150, a display 160, and a communication interface 170. In some embodiments, the electronic device 101 may exclude at least one of the components or may add another component.

The bus 110 includes a circuit for connecting the components 120 to 170 with one another and transferring communications (e.g., control messages and/or data) between the components 120 to 170.

The processing module 120 includes one or more of a central processing unit (CPU), an application processor (AP), or a communication processor (CP). The processor 120 performs control on at least one of the other components of the electronic device 101, and/or performs an operation or data processing relating to communication.

The processor 120 controls the display of a user interface through the display 160 based on a point where the user input is entered, a region adjacent to the user input, or a point adjacent to the user, i.e., an adjacent position. For example, when the user input or the region adjacent to the user input is positioned deviated to the right on the touchscreen, the processor 120 controls the display 160 to display the user display to deviate to the right. Further, when the user input or the region adjacent to the user input is positioned deviated to the left on the touchscreen, the processor 120 controls the display 160 to display the user display to deviate to the left.

According to an embodiment of the present disclosure, upon entry of a touch input (e.g., a first touch input) by the user's body portion or an object through the touchscreen included in the display 160, the processor 120 detects the contact of the body portion or object on the touchscreen, its adjacent region, or adjacent position. For example, the touchscreen is assumed to have been implemented in a capacitive type. The processor 120 determines the adjacent region as a region adjacent to a point on the touchscreen, which exhibits a maximum capacitance variation by the first touch input. Further, the processor 120 determines the adjacent position as a point adjacent to the point which exhibits the maximum capacitance variation. The processor 120 determines the position where the first touch input has been entered as the point on the touchscreen which exhibits the maximum capacitance variation by the first touch input.

According to an embodiment of the present disclosure, the processor 120 determines a user interface to be displayed on the touchscreen at least partially based on a relative relation between the position of the first touch input, the adjacent region or the adjacent position. For example, the processor 120 determines whether to display the user interface, deviated to the left on the touchscreen or to the right on the touchscreen based on at least one of the position of the first touch input, the adjacent region, or the adjacent position. Further, the processor 120 determines whether to display the user interface on the top or bottom of the touchscreen based on at least one of the position of the first touch input, the adjacent region, or the adjacent position.

According to an embodiment of the present disclosure, the processor 120 determines whether to display the user interface on the whole area or a portion of the touchscreen.

The display 160 displays the user interface on the whole or a portion (e.g., a left side, right side, upper portion, or lower portion) of the touchscreen depending on the determination by the processor 120.

The memory 130 may include a volatile and/or non-volatile memory. For example, the memory 130 stores commands or data related to at least one other component of the electronic device 101. The memory 130 stores software and/or a program 140. The program 140 may include a kernel 141, middleware 143, an application programming interface (API) 145, and/or applications 147. At least a portion of the kernel 141, middleware 143, or API 145 may be referred to as an operating system (OS).

For example, the kernel 141 controls or manages system resources (e.g., the bus 110, processor 120, or a memory 130) used to perform operations or functions implemented in other programs (e.g., the middleware 143, API 145, or applications 147). The kernel 141 may provide an interface that allows the middleware 143, the API 145, or the applications 147 to access the individual components of the electronic device 101 to control or manage the system resources.

The middleware 143 functions as a relay to allow the API 145 or the applications 147 to communicate data with the kernel 141. One or more applications 147 may be provided. The middleware 143 controls work requests received from the applications 147 by allocating the priority of using the system resources of the electronic device 101 (e.g., the bus 110, the processor 120, or the memory 130) to at least one of the applications 147.

The API 145 is an interface allowing the application 147 to control functions provided from the kernel 141 or the middleware 143. For example, the API 133 may include at least one interface or function (e.g., a command) for file control, window control, image processing or text control.

The input/output interface 150 serves as an interface that may, e.g., transfer commands or data input from a user or other external devices to other component(s) 110 to 140 or 160 to 170 of the electronic device 101. Further, the input/output interface 150 may output commands or data received from other component(s) 110 to 140 or 160 to 170 of the electronic device 101 to the user or the other external device.

The display 160 includes, e.g., a liquid crystal display (LCD), a light emitting diode (LED) display, an organic light emitting diode (OLED) display, or a microelectromechanical systems (MEMS) display, or an electronic paper display. The display 160 displays various contents (e.g., text, images, videos, icons, or symbols) to the user. The display 160 may include a touchscreen and receive, e.g., a touch, gesture, proximity or hovering input using an electronic pen or a body portion of the user.

According to an embodiment of the present disclosure, the display 160 may receive a first touch input by a body portion of the user or an object through the touchscreen. Further, the display 160 displays the user interface depending on an object inputted. For example, when the touch input or region adjacent to the touch input is deviated to the right on the touchscreen, the display 160 displays the user interface to deviate to the right under the control of the processor 120. Further, when the touch input or region adjacent to the touch input is deviated to the left on the touchscreen, the display 160 displays the user interface to deviate to the left under the control of the processor 120.

The communication interface 170 sets up communication between the electronic device 101 and an external device, e.g., a first external electronic device 102, a second external electronic device 104, or a server 106. For example, the communication interface 170 may directly communicate with the first external electronic device 102 via wired or wireless communication 164. Alternatively or additionally, the communication interface 170 may be connected with a network 162 through wireless or wired communication to communicate with the second external electronic device 104.

The wireless communication may use at least one of, e.g., long term evolution (LTE), long term evolution-advanced (LTE-A), code division multiple access (CDMA), wideband code division multiple access (WCDMA), universal mobile telecommunication system (UMTS), wireless broadband (WiBro), or global system for mobile communication (GSM), as a cellular communication protocol.

The wired connection may include at least one of universal serial bus (USB), high definition multimedia interface (HDMI), recommended standard 232 (RS-232), or plain old telephone service (POTS).

The network 162 is a telecommunication networks, e.g., a computer network (e.g., LAN or WAN), Internet, or a telephone network.

The first external electronic devices 102 and the second external electronic 104 each may be a device of the same or a different type from the electronic device 101.

According to an embodiment of the present disclosure, the server 106 may include a group of one or more servers.

According to an embodiment of the present disclosure, all or some of operations executed on the electronic device 101 may be executed on another or multiple other electronic devices, e.g., the first external electronic device 102, the second external electronic device 104, or the server 106. When the electronic device 101 should perform some function or service automatically or by request, the electronic device 101, instead of executing the function or service on its own or additionally, may request the first external electronic device 102, the second external electronic device 104, or the server 106 to perform at least some functions associated therewith. In this case, the first external electronic device 102, the second external electronic device 104, or the server 106 may execute the requested functions or additional functions and transfer a result of the execution to the electronic device 101. The electronic device 101 may then provide the requested function or service by processing the received result as it is or additionally. To that end, a cloud computing, distributed computing, or client-server computing technique may be used, for example.

According to an embodiment of the present disclosure, an electronic device receiving a user input may comprise a display, including a touchscreen, that receives a first touch input on the touchscreen; and a processor configured to detect at least one of a region contacted by the first touch input on the touchscreen, a region adjacent to the contacted region, and a position adjacent to the contacted region, after receiving the first touch input, and control the display to display a user interface on the touchscreen at least partially based on a relative relation between the region contacted by the first touch input, and at least one of the adjacent region and the adjacent position.

According to an embodiment of the present disclosure, an electronic device receiving a user input includes a display, including a touchscreen, configured to receive a first touch input on the touchscreen; and a processor configured to detect at least one of a region contacted by the first touch input on the touchscreen, a region adjacent to the contacted region, and a position adjacent to the contacted region, before receiving the first touch input, and control the display to display a user interface on the touchscreen at least partially based on a relative relation between the region contacted by the first touch input, and at least one of the adjacent region and the adjacent position.

Figure 4:
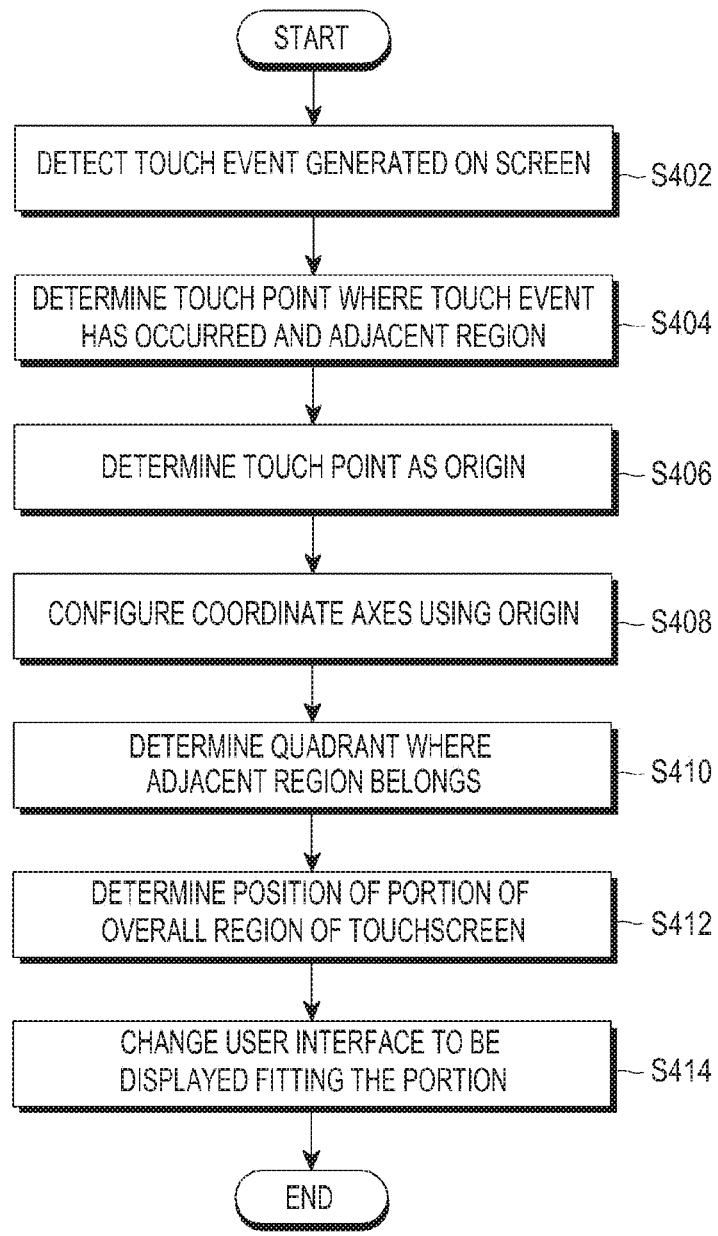
FIG. 4 is a flowchart of a method for providing a user interface by an electronic device, according to an embodiment of the present disclosure.

FIG. 4 is a flowchart of a method for providing a user interface by an electronic device, according to an embodiment of the present disclosure.

Referring to FIG. 4, at step S402, the electronic device 101 detects a touch event generated on the screen, e.g., the touchscreen. The touch event is generated when the user touches at least one point on the screen using an input tool (e.g., the user's finger or stylus).

At step S404, the processor 120 of the electronic device 101 determines a touch point (e.g., a first touch point) where the touch event has occurred and a region adjacent to the touch point. The input/output interface 150 of the electronic device 101 or a touch panel included in the display 160 detects the occurrence of the touch event at the touch point. The touch panel provides the coordinates of the point where the touch event has occurred to the processor 120. Further, the touch panel detects the adjacent region.

For example, the touch panel is assumed to have been implemented in a capacitive type. The processor 120 controls the touch panel to measure a variation in capacitance that is generated by the touch event. The variation in capacitance may be highest at the touch point and may be decreased away from the touch point. The processor 120 determines the touch point where the touch event has occurred based on the variation in capacitance that has occurred due to the touch event. Further, the processor 120 determines that the variation in capacitance is not more than a predetermined maximum value (e.g., the variation in capacitance at the touch point) and that a region having a predetermined reference value or more is the adjacent region.

At step S406, the processor 120 determines the touch point as the origin.

At step S408, the processor 120 sets coordinate axes using the origin.

When the coordinate axes are set, the processor 120, at step S410, determines the quadrant where the adjacent region belongs.

At step S412, the processor 120 determines an arrangement of some regions of the whole touchscreen. That is, the processor 120 determines the position of a region of the whole touchscreen. A user interface may be displayed on the region. For example, it is assumed that the area of the whole touchscreen is 100, and the area of the region is 70. The processor 120 determines where the region with an area of 70 is positioned on the whole touchscreen, and the partial region may be displayed deviated to the left, right, top, or bottom of the whole touchscreen depending on the determination of the processor 120.

At step S414, the processor 120 repositions the user interface so that the user interface is displayed fitting the partial region. For example, it may be assumed that the processor 120 determines that the partial region of the whole touchscreen (e.g., a region taking up ⅔ of the area of the whole touchscreen) is displayed on a left and upper portion thereof. The processor 120 controls the display 160 to display the user interface so that the user interface may be included in the left-and-upper partial region. According to an embodiment of the present disclosure, the processor 120 may enlarge or shrink the user interface so that the user interface may be included in the partial region. For example, it is assumed that the area of the whole touchscreen is 100, and the area of the region is 65. Prior to step S402, the user interface may be displayed on the whole area, i.e., to have an area of 100, through the display 160. Further, in step S414, the processor 120 may shrink the user interface to 65 or less so that the area of the user interface fits into the partial region having an area of 65.

Figure 5:
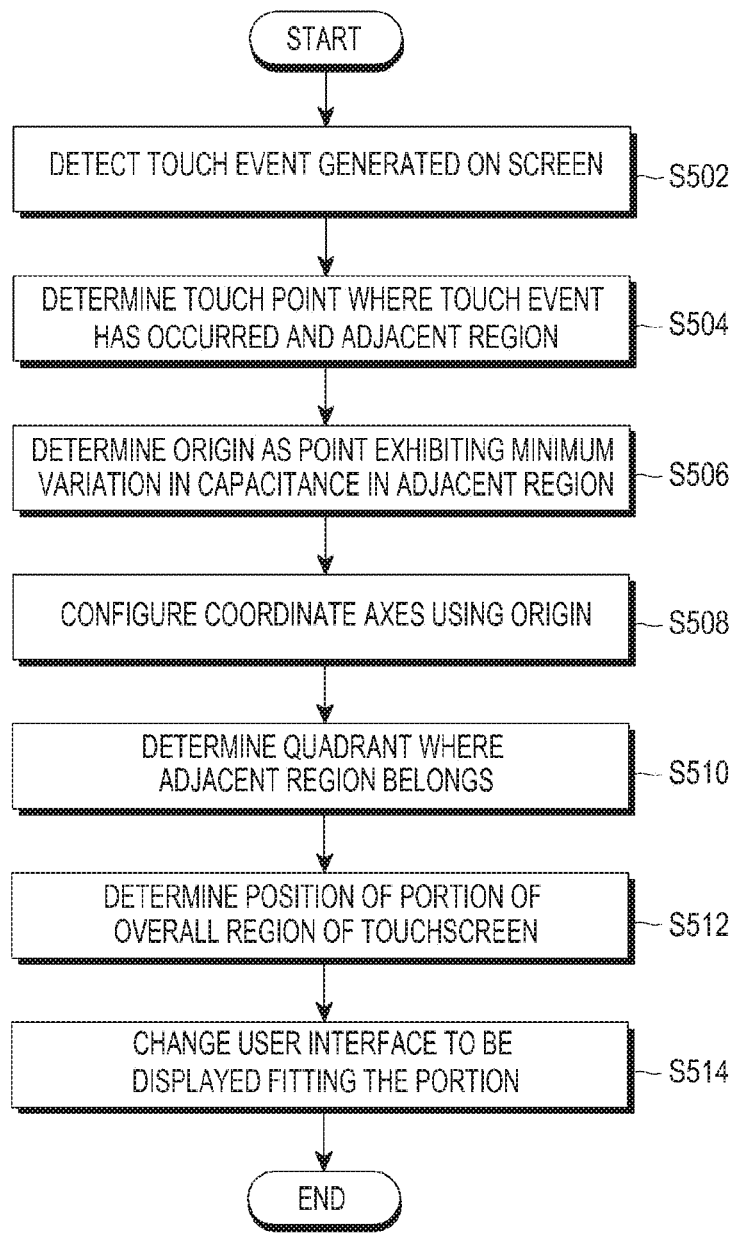
FIG. 5 is a flowchart of a method for providing a user interface by an electronic device, according to an embodiment of the present disclosure.

FIG. 5 is a flowchart of a method for providing a user interface by an electronic device, according to an embodiment of the present disclosure.

Referring to FIG. 5, at step S502, the electronic device 101 detects a touch event generated on the screen, e.g., the touchscreen. The touch event is generated when the user touches at least one point on the screen using an input tool (e.g., the user's finger or stylus).

At step S504, the processor 120 of the electronic device 101 determines a touch point (e.g., a first touch point) where the touch event has occurred and an adjacent region. The input/output interface 150 of the electronic device 101 or a touch panel included in the display 160 detects the occurrence of the touch event at the touch point. The touch panel provides the coordinates of the point where the touch event has occurred to the processor 120. Further, the touch panel detects the adjacent region. The adjacent region, which is a region adjacent to the touch point, includes a region where a hovering input is detected.

At step S506, the processor 120 determines the origin as a point of the adjacent region which exhibits a minimum variation in capacitance. Here, the variation in capacitance in the random access may be not more than a predetermined maximum value at the touch point (e.g., the variation in capacitance at the touch point) and may be a predetermined reference value or more. According to an embodiment of the present disclosure, the point which exhibits the minimum variation in capacitance may be a point where the distance between the touchscreen and an input tool (e.g., a stylus pen or user's finger) is largest among points in the adjacent region where the input tool is detected by the touchscreen.

Alternatively, the processor 120 may determine the origin as a point of the adjacent region where the variation in capacitance is 0.

At step S508, the processor 120 sets coordinate axes using the origin.

When the coordinate axes are set, the processor 120, at step S510, determines the quadrant where the adjacent region belongs.

At Step S512, the processor 120 determines an arrangement of some regions of the whole touchscreen. That is, the processor 120 determines the position of some region of the whole touchscreen. A user interface may be displayed on the region.

At step S514, the processor 120 repositions the user interface so that the user interface is displayed fitting the partial region. For example, it may be assumed that the processor 120 determines that the partial region of the whole touchscreen (e.g., a region taking up ⅔ of the area of the whole touchscreen) is displayed on a right and lower portion thereof. The processor 120 controls the display 160 to display the user interface so that the user interface may be included in the right-and-lower partial region. According to an embodiment of the present disclosure, the processor 120 may enlarge or shrink the user interface so that the user interface may be included in the partial region.

According to an embodiment of the present disclosure, a method for receiving a user input by an electronic device includes receiving a first touch input on a touchscreen; detecting at least part of a region contacted by the first touch input on the touchscreen, a region adjacent to the contacted region, and a position adjacent to the contacted region, after receiving the first touch input; and displaying a user interface on the touchscreen at least partially based on a relative relation between the region contacted by the first touch input, and at least one of the adjacent region, and the adjacent position.

According to an embodiment of the present disclosure, a method for receiving a user input by an electronic device includes detecting at least one of a region and a position adjacent to where a portion of a user's body or an object is positioned adjacent to a touchscreen; detecting a touch input on the touchscreen by the user's body portion or the object after detecting at least one of the adjacent region and the adjacent position; and displaying a user interface on the touchscreen at least partially based on a relative relation between the touch input, and the at least one of the adjacent region and the adjacent position.

Figure 6:
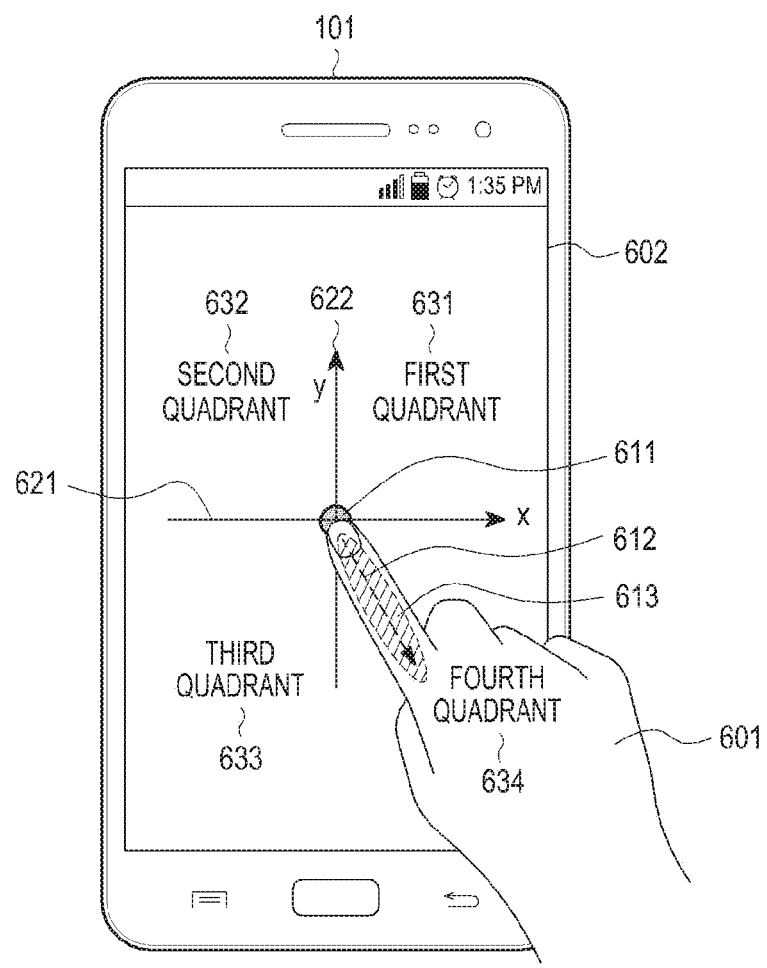
FIG. 6 illustrates a method of an electronic device for receiving a user input to configure a coordinate axis, according to an embodiment of the present disclosure.

FIG. 6 illustrates a method of an electronic device for receiving a user input to configure a coordinate axis, according to an embodiment of the present disclosure.

Referring to FIG. 6, a user input is entered where an input tool, e.g., the user's finger 601, selects a first touch point of the touch screen 602. By the user input, the electronic device 101 generates a touch event to select the first touch point. The processor 120 of the electronic device 101 determines the origin 611 as the point where the touch has been made by the finger 601, i.e., the first touch point, and determines the adjacent region 613 as the region where the capacitance has been changed by the touch event.

The processor 120 sets coordinate axes, including an x axis 621 and a y axis 622 with respect to the origin 611. The screen 602 is divided by the coordinate axes 621 and 622 into four quadrants, i.e., a first quadrant 631, a second quadrant 632, a third quadrant 633, and a fourth quadrant 634. The processor 120 determines the quadrant where the adjacent region 613 is positioned among the four quadrants 631 to 634. As shown in FIG. 6, the adjacent region 613 is positioned in the fourth quadrant 634.

An area of the adjacent region 613 where the distance between the screen 602 and the input tool, i.e., the user's finger 601, is small may be referred to as an input region 612. As shown in FIG. 6, the input region 612 may be shaped as a straight line connecting mid-points of the adjacent region 613. The processor 120 controls the display 160 so that the user interface is displayed adjacent to the input region 612. For example, when the input region 612 is shown at a right and lower portion of the screen 602, the processor 120 determines that the user is entering a user input (e.g., a touch input or hovering input) to the electronic device 101 at a right and lower portion of the electronic device 101. Accordingly, the display 160 displays the user interface to deviate down and to the right. When the input region is shown at a left and upper portion of the screen 602, the display 160 displays the user interface to deviate up and to the left. Here, the display 160 may enlarge or shrink the user interface under the control of the processor 120.

According to an embodiment of the present disclosure, the adjacent region 613 may be placed over the x axis 621 or y axis 622. When the adjacent region 613 is placed over the x axis 621, if the adjacent region 612 is positioned at a left side of the origin 611, the processor 120 controls the display 160 to display the user interface, with the user interface deviated to the left. When the adjacent region 612 is positioned at a right side of the origin 611, the processor 120 controls the display 160 to display the user interface, with the user interface deviated to the right. When the adjacent region 613 is placed over the y axis 622, the processor 120 controls the display 160 so that the user interface does not deviate or controls the display 160 so that the user interface is displayed according to a previous setting.

Figure 7:
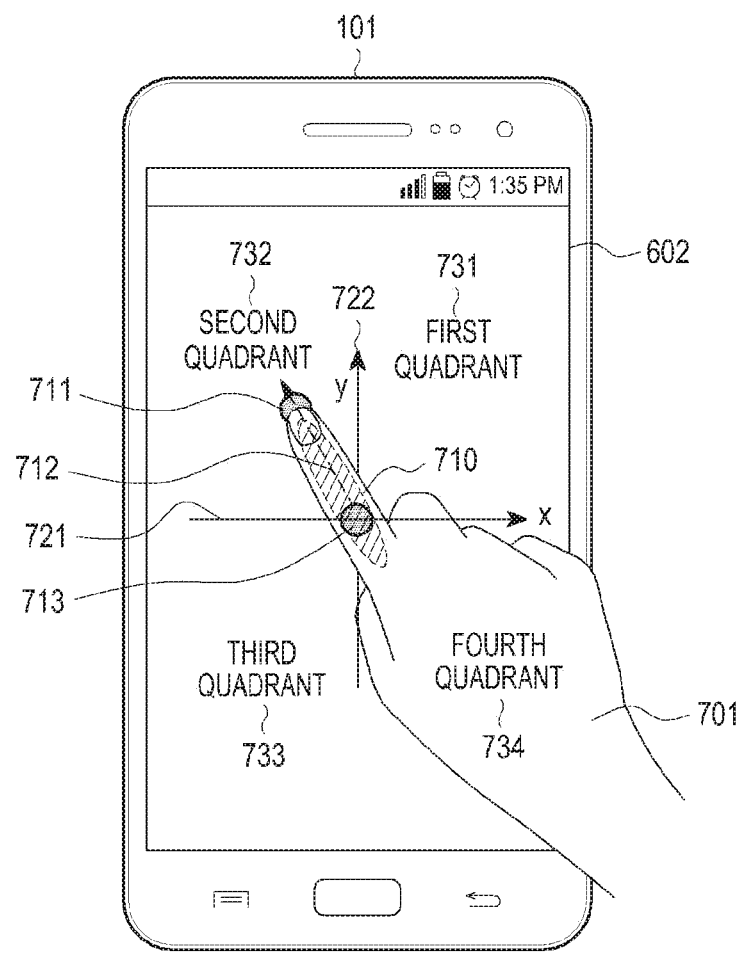
FIG. 7 illustrates a method of an electronic device for receiving a user input to configure a coordinate axis, according to an embodiment of the present disclosure.

FIG. 7 illustrates a method of an electronic device for receiving a user input to configure a coordinate axis, according to an embodiment of the present disclosure.

Referring to FIG. 7, a user input is entered where an input tool, e.g., the user's finger 701, selects a first touch point 711 of the touch screen 602. By the user input, the electronic device 101 generates a touch event to select the first touch point 711. The processor 120 of the electronic device 101 determines the origin 713 as the point exhibiting the minimum variation in capacitance within the adjacent region 710 generated by the touch event.

The processor 120 sets coordinate axes, including an x axis 721 and a y axis 722 with respect to the origin 713. The screen 602 may be divided by the coordinate axes 721 and 722 into four quadrants, i.e., a first quadrant 731, a second quadrant 732, a third quadrant 733, and a fourth quadrant 734. The processor 120 determines the quadrant where the adjacent region 710 is positioned among the four quadrants 731 to 734. As shown in FIG. 7, the adjacent region 710 is positioned in the second quadrant 732.

An area of the adjacent region 713 where the distance between the screen 602 and the input tool, i.e., the user's finger 701, is small may be referred to as an input region 712. As shown in FIG. 7, the input region 712 may be shaped as a straight line connecting mid-points of the adjacent region 713. The processor 120 controls the display 160 so that the user interface is displayed adjacent to the input region 712 from the origin 713. For example, when the input region 712 is shown at a left and upper portion of the screen 602, the processor 120 determines that the user is entering a user input (e.g., a touch input or hovering input) to the electronic device 101 at a right and lower portion of the electronic device 101. Accordingly, the display 160 displays the user interface to deviate down and to the right. When the input region 712 is shown at a right and lower portion of the screen 702, the display 160 displays the user interface to deviate up and to the left. Here, the display 160 may enlarge or shrink the user interface under the control of the processor 120.

Figure 8:
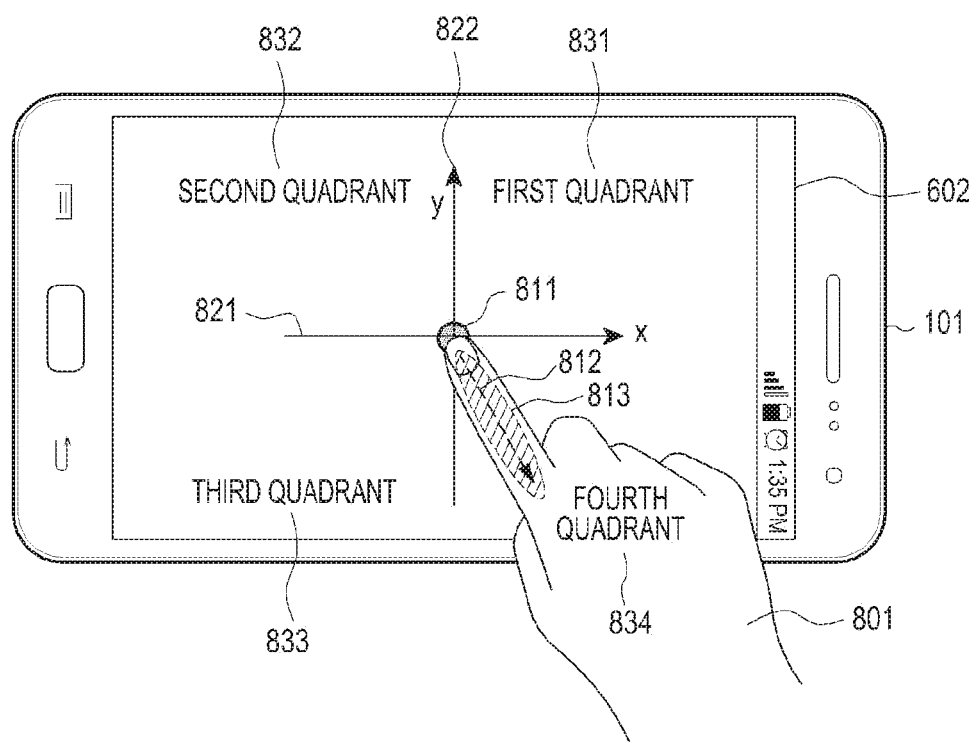
FIG. 8 illustrates a method of an electronic device for receiving a user input to configure a coordinate axis, according to an embodiment of the present disclosure.

FIG. 8 illustrates a method of an electronic device for receiving a user input to configure a coordinate axis, according to an embodiment of the present disclosure.

Referring to FIG. 8, the electronic device 101 is shown in the position where the electronic device 101 shown in FIGS. 6 and 7 has been rotated clockwise 90°. In this state, the user is enters a user input where an input tool, e.g., the user's finger 801, selects a first touch point of the screen 602. By the user input, the electronic device 101 generates a touch event to select the first touch point. The processor 120 of the electronic device 101 determines the origin 811 as the point where the touch has been made by the user, i.e., the first touch point, and determines the adjacent region 813 as the region where the capacitance has been changed by the touch event.

As shown in FIG. 8, the processor 120 sets coordinate axes, including an x axis 821 and a y axis 822 with respect to the origin 811. The screen 602 is divided by the coordinate axes 821 and 822 into four quadrants, i.e., a first quadrant 831, a second quadrant 832, a third quadrant 833, and a fourth quadrant 834. As shown in FIG. 8, the first to fourth quadrants 831 to 834 may be changed depending on whether the electronic device 101 is rotated, rather than fixed. According to an embodiment of the present disclosure, regardless of whether the electronic device 101 rotates, the x axis 821 may be horizontal to the ground, and the y axis 822 may be perpendicular to the ground.

The processor 120 determines the quadrant where the adjacent region 813 is positioned among the four quadrants 831 to 834. As shown in FIG. 8, the adjacent region 813 is positioned in the fourth quadrant 834.

An area of the adjacent region 813 where the distance between the screen 602 and the input tool, i.e., the user's finger 801, is small may be referred to as an input region 812. As shown in FIG. 8, the input region 812 may be shaped as a straight line connecting mid-points of the adjacent region 813. The processor 120 controls the display 160 so that the user interface is displayed adjacent to the input region 812 or the origin 811. For example, when the origin 811 or the input region 812 is shown at a right and lower portion of the screen 602, the display 160 displays the user interface to deviate down and to the right. When the origin 811 or the input region 812 is shown at a right and upper portion of the screen 602, the display 160 displays the user interface to deviate up and to the right. Here, the display 160 may enlarge or shrink the user interface under the control of the processor 120.

Figure 9:
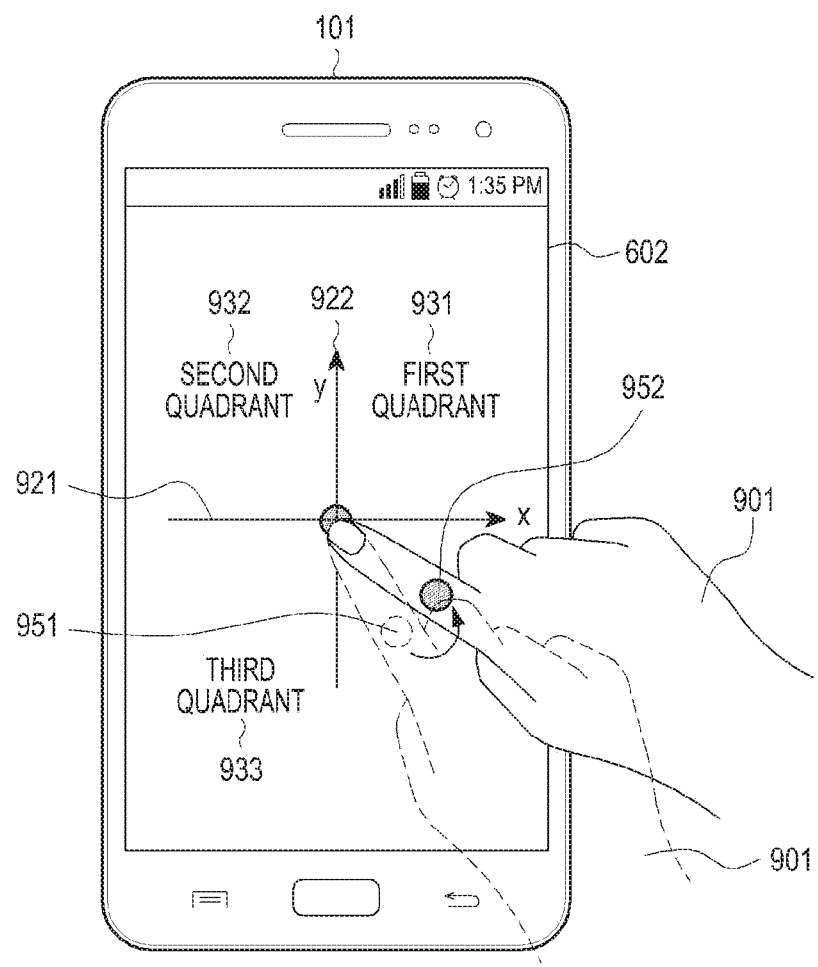
FIG. 9 illustrates a method of an electronic device for receiving a user input, according to an embodiment of the present disclosure.

FIG. 9 illustrates a method of an electronic device for receiving a user input, according to an embodiment of the present disclosure.

Referring to FIG. 9, a first user input is entered by a user 901 where an input tool, e.g., the user's finger 901, selects a first touch point of the screen 602. By the user input, the electronic device 101 generates a touch event to select the first touch point. The processor 120 of the electronic device 101 determines the origin 941 as the first touch point where the touch has been made by the user, and determines the adjacent region 951 as the region where the capacitance has been changed by the touch event.

The processor 120 sets coordinate axes including an x axis 921 and a y axis 922 with respect to the origin 941. The screen 602 is divided by the coordinate axes 921 and 922 into four quadrants, i.e., a first quadrant 931, a second quadrant 932, a third quadrant 933, and a fourth quadrant 934.

When the user 901 turns his wrist from left to right with a fingertip fixed to the origin 941. The first user input for selecting the origin 941 and a second user input for turning the wrist with the origin 941 selected is sequentially entered to the electronic device 101. When the first user input and then the second user input are entered, the adjacent region 951 generated by the first user input disappears due to the second user input. Further, a new adjacent region 952 is generated by the second user input. According to an embodiment of the present disclosure, the touch panel of the display 160 detects the adjacent region 952 generated by the second user input and sends a result of the detection to the processor 120. As shown in FIG. 9, when the first user input and the second user input are consecutively entered, the processor 120 determines the first and second user inputs as a single gesture input. Further, the processor 120 controls the electronic device 101 to perform an operation corresponding to the gesture input.

Figures 10A, 10B:
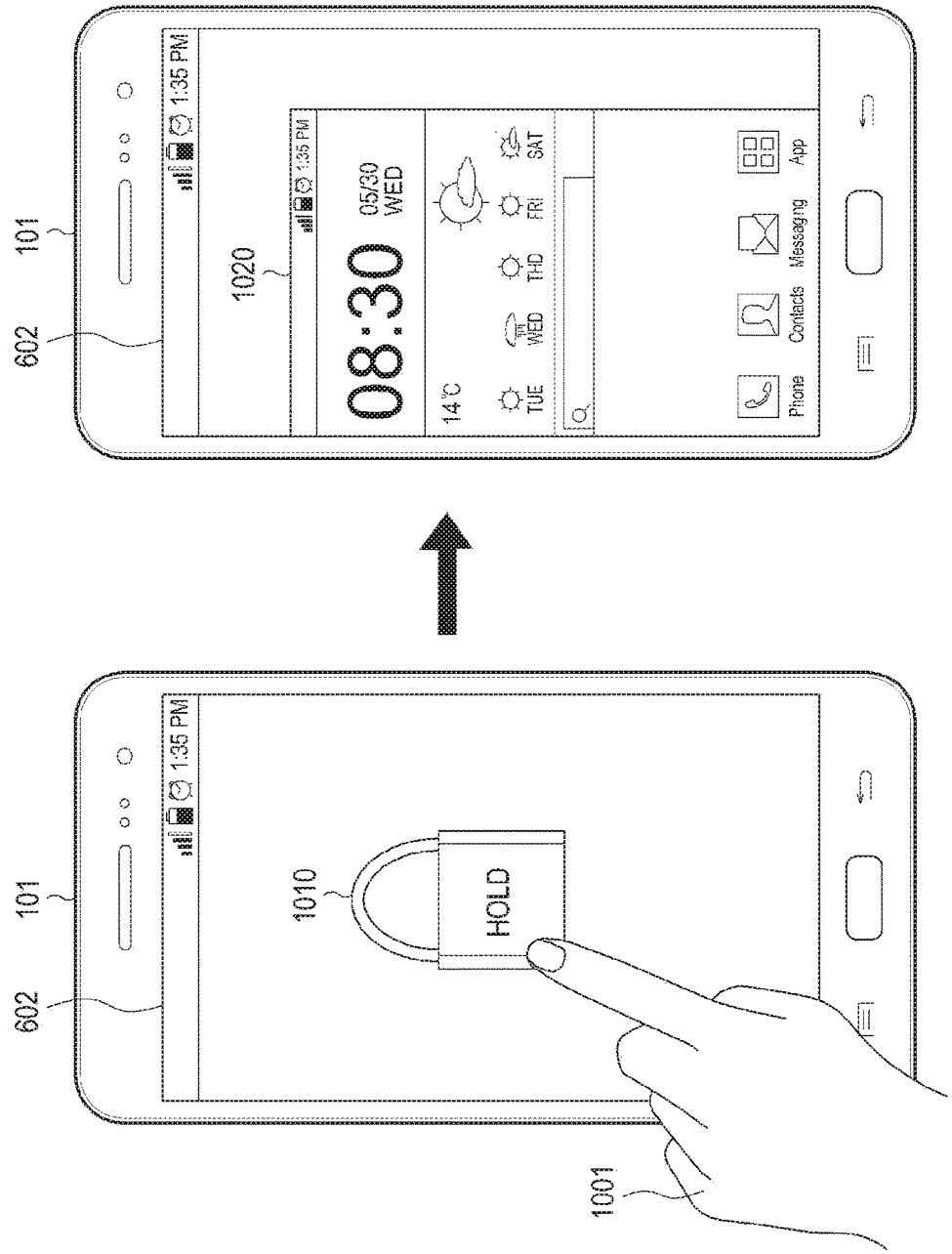
FIGS. 10A and 10B illustrate a method of an electronic device for displaying a user interface, according to an embodiment of the present disclosure.

FIGS. 10A and 10B illustrates a method of an electronic device for display a user interface, according to an embodiment of the present disclosure.

Referring to FIGS. 10A and 10B, an electronic device 101 is provided. FIG. 10A illustrates the electronic device 101 detecting a user input, and FIG. 10B illustrates a user interface displayed by the user input.

Referring to FIG. 10A, a lock screen including a lock 1010 is displayed on a touch screen 602 of the electronic device 101. The user 1001 enters a user input to the electronic device 101 by touching the screen 602 using his left hand. By the user input, the lock screen is released, and the standby screen 1020 is displayed on the screen 602, as shown in FIG. 10B.

The user input shown in FIG. 10A is described with reference to the x axis 621 and the y axis 622 shown in FIG. 6. The processor 120 determines the point touched by the user 1001 as the origin. Further, as shown in FIG. 6, the screen 602 may be divided with respect to the origin by the coordinate axes 621 and 622 into four quadrants, i.e., a first quadrant 631, a second quadrant 632, a third quadrant 633, and a fourth quadrant 634. Further, the processor 120 determines the adjacent region as the point where the user input has been entered, i.e., the region which is positioned adjacent to the origin, and the capacitance has been varied. As shown in FIG. 10A, the user 1001 is enters the user input using a finger of his left hand, and thus, the adjacent region is positioned in the third quadrant 633.

The processor 120 controls the display 160 so that the user interface is displayed adjacent to the input region. In the example shown in FIG. 10A, since the adjacent region is in the third quadrant 633, i.e., positioned at a left and lower portion, the processor 120 displays the user interface with the user interface deviated down and to the left. Here, the display 160 may enlarge or shrink the user interface under the control of the processor 120.

As described above, since the user input has been entered to the screen 602 by the user's left hand as shown in FIG. 10A, and its corresponding adjacent region has been shown at the left and lower portion, the processor 120 controls the display 160 to display the standby screen 1020 at the left and lower portion of the screen 602. Thus, the user may easily control the electronic device 101 using his left hand.

FIGS. 11A and 11B illustrate a method of an electronic device for displaying a user interface, according to an embodiment of the present disclosure.

Referring to FIGS. 11A and 11B, an electronic device 101 is provided. FIG. 11A illustrates the electronic device 101 detecting a user input, and FIG. 11B illustrates a user interface displayed by the user input.

Referring to FIG. 11A, the display 160 of the electronic device 101 displays the standby screen 1111, including execution icons 1121, 1122, 1123, and 1124 are included in the standby screen 1111. The display 160 displays the standby screen 1111 deviated. By entering a user input of selecting one of the execution icons 1121 to 1124 a user 1101 may run an application associated with the selected execution icon.

As shown in FIG. 11A, the user 1101 enters a user input using a finger of the user's left hand to select execution icon 1122 corresponding to an address book application. The user input shown in FIG. 11A is described with reference to the x axis 621 and the y axis 622 shown in FIG. 6. The processor 120 determines the point touched by the user 1101 as the origin. Further, as shown in FIG. 6, the screen 602 is divided with respect to the origin by the coordinate axes 621 and 622 into four quadrants, i.e., a first quadrant 631, a second quadrant 632, a third quadrant 633, and a fourth quadrant 634. Further, the processor 120 determines the adjacent region as the point where the user input has been entered, i.e., the region which is positioned adjacent to the origin and the capacitance has been varied. As shown in FIG. 11A, the user 1101 enters the user input using a finger of his left hand, and thus, the adjacent region is positioned in the third quadrant 633.

The processor 120 controls the display 160 so that the user interface is displayed adjacent to the input region. In the example shown in FIG. 11A, since the adjacent region is in the third quadrant 633, i.e., positioned at a left and lower portion, the processor 120 displays the user interface with the user interface deviated down and to the left. The display 160 may enlarge or shrink the user interface under the control of the processor 120.

Referring to FIG. 11B, the processor 120 controls the electronic device 101 to run the address book application according to the user input. Further, the processor 120 controls the display 160 to display a portion or whole of the user interface according to the position of the adjacent region or adjacent to the adjacent region. FIG. 11B shows an execution screen 1112 where the address book application is running. Since the adjacent region corresponds to the left and lower portion, the processor 120 controls the electronic device 101 so that an index 1131 of the address book is positioned at a left side of the execution screen 1112.

Figure 12A:
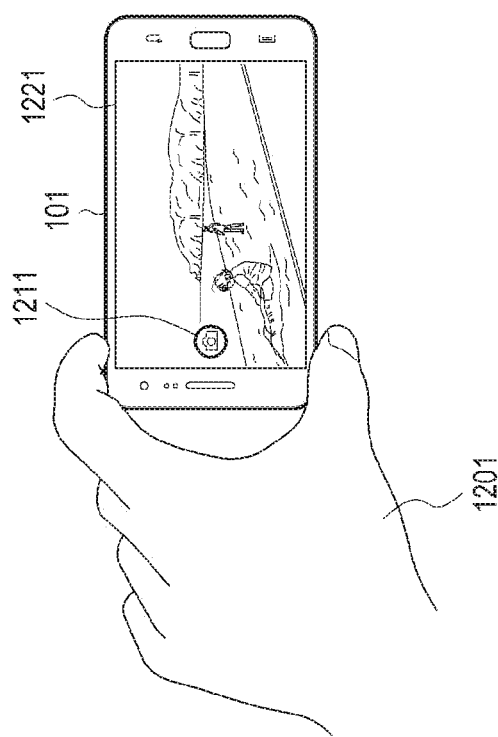
FIGS. 12A and 12B illustrate a method of an electronic device for displaying a user interface, according to an embodiment of the present disclosure.
Figure 12B:
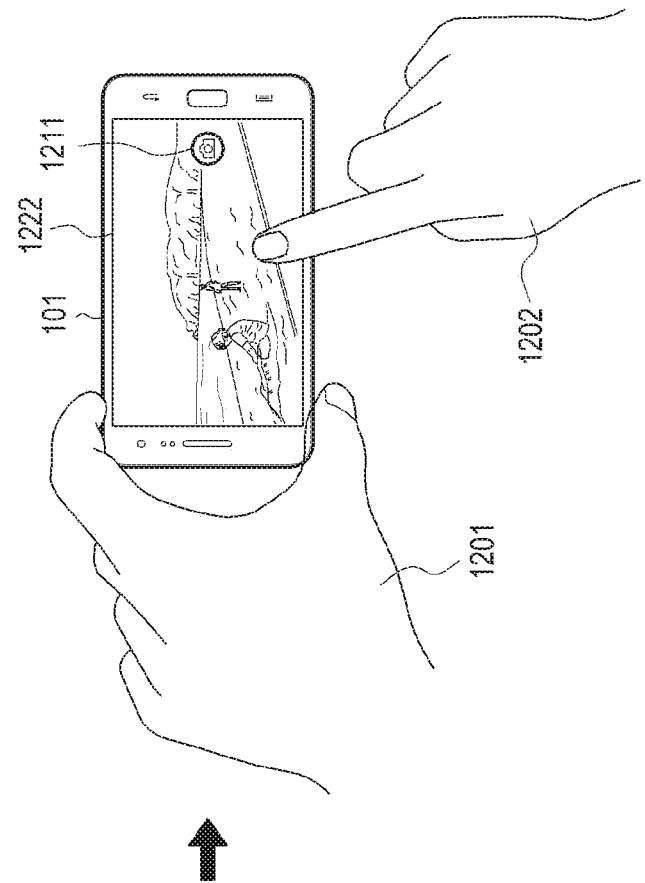

FIGS. 12A and 12B illustrate a method of an electronic device, for displaying a user interface, according to an embodiment of the present disclosure.

Referring to FIGS. 12A and 12B, an electronic device 101 is provided. FIG. 12A illustrates a camera function executed on the electronic device 101, and FIG. 12B illustrates a user interface displayed depending on the direction of a user input.

Referring to FIG. 12A, the display 160 of the electronic device 101 displays images on a screen 1221, input in real time through a lens included in a camera module of the electronic device 101. Further, the display 160 displays on the screen 1221 a capturing button 1211 for converting images input in real time through the lens into still images and videos and storing the same. FIG. 12A is shown held by a user's left hand 1201.

Referring to FIG. 12B, the user enters a user input to the electronic device 101 by touching a point on the screen 1222 with the index finger of his right hand 1202 that corresponds to an input object. The processor 120 may adjust the position where the user interface is displayed according to the user input as shown in FIG. 12B.

The user input shown in FIG. 12B is described with reference to the x axis 621 and the y axis 622 shown in FIG. 6. The processor 120 determines the point touched by the right hand 1202 as the origin. Further, as shown in FIG. 6, the screen 602 may be divided with respect to the origin by the coordinate axes 621 and 622 into four quadrants, i.e., a first quadrant 631, a second quadrant 632, a third quadrant 633, and a fourth quadrant 634. Further, the processor 120 determines the adjacent region as the point where the user input has been entered, i.e., the region which is positioned adjacent to the origin, and the capacitance has been varied. As shown in FIG. 12B, the user enters the user input using a finger of his right hand 1202, and thus, the adjacent region is in the fourth quadrant 634.

The processor 120 controls the display 160 so that at least a portion of the user interface is displayed adjacent to the input region. Since the adjacent region is shown on the fourth quadrant 634, i.e., the right and lower portion in the example shown in FIG. 12B, the processor 120 controls the display 160 to display the capturing button 1211 on the right side so that the user may easily enter a user input using his right hand.

Figure 13:
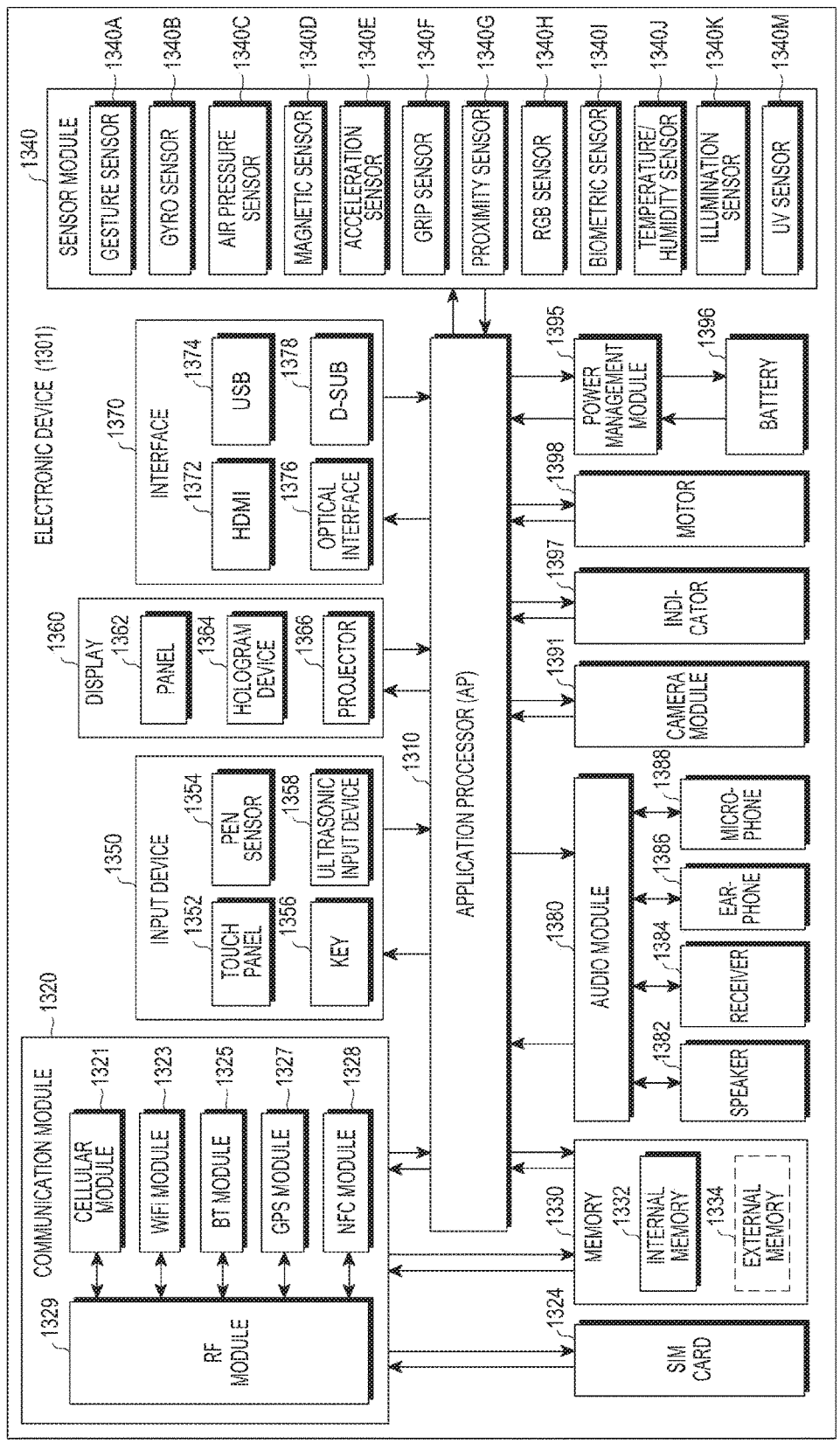
FIG. 13 is a block diagram of a configuration of an electronic device, according to an embodiment of the present disclosure.

FIG. 13 is a block diagram of a configuration of an electronic device, according to an embodiment of the present disclosure.

Referring to FIG. 13, an electronic device 1301 is provided. The electronic device 1301 includes the whole or part of the configuration of, e.g., the electronic device 101 shown in FIG. 3. The electronic device 1301 includes one or more application processors (APs) 1310, a communication module 1320, an SIM (subscriber identification module) card 1324, a memory 1330, a sensor module 1340, an input device 1350, a display 1360, an interface 1370, an audio module 1380, a camera module 1391, a power management module 1395, a battery 1396, an indicator 1397, and a motor 1398.

The AP 1310 controls multiple hardware and software components connected to the AP 1310 by running an operating system or application programs. Additionally, the AP 1310 processes and computes various data. The AP 1310 may be implemented in a system on chip (SoC). According to an embodiment of the present disclosure, the AP 1310 may further include a graphic processing unit (GPU) and/or an image signal processor. The AP 1310 may include at least some (e.g., a cellular module 1321) of the other components of the electronic device 1301. The AP 1310 loads a command or data received from at least one of other components (e.g., a non-volatile memory) on a volatile memory, processes the command or data, and stores various data in the non-volatile memory.

The communication module 1320 may have the same or similar configuration to the communication interface 150 of FIG. 3. The communication module 1320 includes, for example, a cellular module 1321, a Wi-Fi module 1323, a Bluetooth (BT) module 1325, a global positioning system (GPS) module 1327, a near-field communication (NFC) module 1328, and a radio frequency (RF) module 1329.

The cellular module 1321 provides, e.g., a voice call, video call, text service or Internet service, through a communication network. According to an embodiment of the present disclosure, the cellular module 1321 performs identification or authentication on the electronic device 1301 in the communication network using the SIM card 1324. The cellular module 1321 may perform at least some of the functions provided by the AP 1310. The cellular module 1321 may include a communication processor (CP).

The WiFi module 1323, the BT module 1325, the GPS module 1327, or the NFC module 1328 includes a process for, e.g., processing data communicated through the module. At least some of the cellular module 1321, the Wi-Fi module 1323, the BT module 1325, the GPS module 1327, and the NFC module 1328 may be included in a single integrated circuit (IC) or an IC package.

The RF module 1329 transmits communication signals (e.g., RF signals). The RF module 1329 may include, for example, a transceiver, a power amp module (PAM), a frequency filter, an LNA (low noise amplifier), or an antenna. According to an embodiment of the present disclosure, at least one of the cellular module 1321, the Wi-Fi module 1323, the BT module 1325, the GPS module 1327, or the NFC module 1328 may communicate RF signals through a separate RF module 1329.

The SIM card 1324 is a card including a subscriber identification module and/or may be an embedded SIM, and contains unique identification information (e.g., an integrated circuit card identifier (ICCID) or subscriber information (e.g., an international mobile subscriber identity (IMSI)).

The memory 1330 (e.g., the memory 130 of FIG. 3) may include, for example, an internal memory 1332 or an external memory 1334.

The internal memory 1332 may include at least one of, for example, a volatile memory (e.g., a dynamic random access memory (DRAM), a static RAM (SRAM), a synchronous dynamic RAM (SDRAM), etc.) or a non-volatile memory (e.g., a one-time programmable read only memory (OTPROM), a programmable ROM (PROM), an erasable and programmable ROM (EPROM), an electrically erasable and programmable ROM (EEPROM), a mask ROM, a flash ROM, a flash memory (e.g., a NAND flash, or a NOR flash), a hard drive, or solid state drive (SSD).

The external memory 1334 may include a flash drive, a compact flash (CF) memory, a secure digital (SD) memory, a micro-SD memory, a min-SD memory, an extreme digital (xD) memory, or a memory stick. The external memory 1334 may be functionally and/or physically connected with the electronic device 1301 via various interfaces.

The sensor module 1340 measures a physical quantity or detects an operational state of the electronic device 1301, and the sensor module 1340 converts the measured or detected information into an electrical signal. The sensor module 1340 may include, a gesture sensor 1340A, a gyro sensor 1340B, an air pressure sensor 1340C, a magnetic sensor 1340D, an acceleration sensor 1340E, a grip sensor 1340F, a proximity sensor 1340G, a color sensor, such as an red-green-blue (RGB) sensor 1340H, a biometric sensor 1340I, a temperature/humidity sensor 1340J, an illumination sensor 1340K, or an ultra violet (UV) sensor 1340M. Additionally or alternatively, the sensing module 1340 may include an E-nose sensor, an electromyography (EMG) sensor, an electroencephalogram (EEG) sensor, an electrocardiogram (ECG) sensor, an infrared (IR) sensor, an iris sensor, or a finger print sensor. The sensor module 1340 may further include a control circuit for controlling at least one or more of the sensors included in the sensing module. According to an embodiment of the present disclosure, the electronic device 1301 may further include a processor configured to control the sensor module 1340 as part of an AP 1310 or separately from the AP 1310, and the electronic device 1301 may control the sensor module 1340 while the AP is in a sleep mode.

The input unit 1350 may include a touch panel 1352, a (digital) pen sensor 1354, a key 1356, or an ultrasonic input device 1358. The touch panel 1352 may use at least one of capacitive, resistive, infrared, or ultrasonic methods. The touch panel 1352 may further include a control circuit. The touch panel 1352 may further include a tactile layer and provides a user with a tactile reaction.

The (digital) pen sensor 1354 may include a part of the touch panel 1352 or a separate sheet for recognition.

The key 1356 may include a physical button, optical key or key pad.

The ultrasonic input device 1358 uses an input tool that generates an ultrasonic signal and enables the electronic device 1301 to identify data by sensing the ultrasonic signal using a microphone 1388.

The display 1360 (e.g., the display 160 of FIG. 3) may include a panel 1362, a hologram device 1364, or a projector 1366.

The panel 1362 may have the same or similar configuration to the display 160 of FIG. 3. The panel 1362 may be implemented to be flexible, transparent, or wearable. The panel 1362 may also be incorporated with the touch panel 1352 in a module.

The hologram device 1364 displays three dimensional (3D) images (holograms) in the air by using light interference.

The projector 1366 displays an image by projecting light onto a screen. The screen may be located inside or outside of the electronic device 1301.

In accordance with an embodiment, the display 1360 may further include a control circuit to control the panel 1362, the hologram device 1564, or the projector 1366.

The interface 1370 may include a high definition multimedia interface (HDMI) 1372, a universal serial bus (USB) 1374, an optical interface 1376, or a D-subminiature (D-sub) 1378.

The interface 1370 may be included in the communication interface 160 shown in FIG. 3. Additionally, or alternatively, the interface 1370 may include a mobile high-definition link (MHL) interface, a secure digital (SD) card/multimedia card (MMC) interface, or infrared data association (IrDA) standard interface.

The audio module 1380 converts a sound into an electric signal or vice versa. At least a part of the audio module 1380 may be included in e.g., the input/output interface 150 as shown in FIG. 3. The audio module 1380 processes sound information input or output through a speaker 1382, a receiver 1384, an earphone 1386, or the microphone 1388.

The camera module 1391 is a device for capturing still images and videos, and may include, according to an embodiment of the present disclosure, one or more image sensors (e.g., front and back sensors), a lens, an Image Signal Processor (ISP), or a flash such as a light emitting diode (LED) or xenon lamp.

The power manager module 1395 manages power of the electronic device 1301. According to an embodiment of the present disclosure, a power management integrated circuit (PMIC), a charger IC, or a battery gauge is included in the power manager module 1395. The PMIC may have a wired and/or wireless recharging scheme.

The wireless charging scheme may include a magnetic resonance scheme, a magnetic induction scheme, or an electromagnetic wave based scheme, and an additional circuit, such as a coil loop, a resonance circuit, a rectifier, etc. may be added for wireless charging.

The battery gauge measures an amount of remaining power, a voltage, a current, or a temperature of the battery 1396 while the battery 1396 is being charged. The battery 1396 may include, for example, a rechargeable battery or a solar battery.

The indicator 1397 indicates a particular state of the electronic device 1301 or a part of the electronic device (e.g., the AP 1310), including a booting state, a message state, or recharging state.

The motor 1398 converts an electric signal to a mechanical vibration and generates a vibration or haptic effect.

A processing unit for supporting mobile TV, such as a GPU may be included in the electronic device 1301. The processing unit for supporting mobile TV may process media data conforming to a standard for digital multimedia broadcasting (DMB), digital video broadcasting (DVB), or MediaFLO™.

Each of the aforementioned components of the electronic device 1301 may include one or more parts, and the name of the part may vary depending on the type of the electronic device 1301.

According to an embodiment of the present disclosure, the electronic device 1301 may be configured to include at least one of the above-described components, and may exclude some of the components or may include other additional components. Some of the components in the electronic device 1301 may be combined into a single entity, and the entity may perform the same functions as the components may do.

Figure 14:
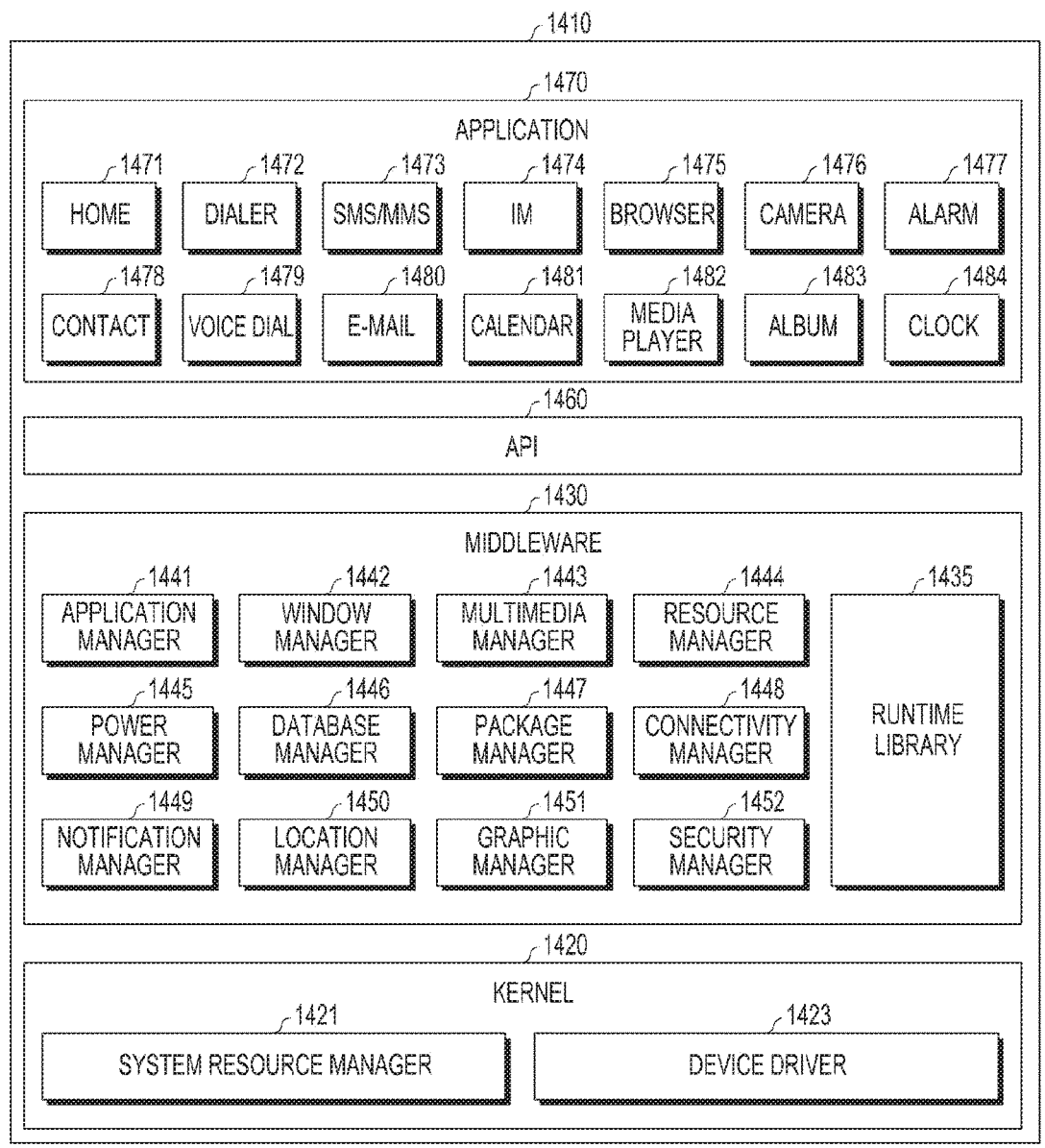
FIG. 14 is a block diagram of a configuration of a program module, according to an embodiment of the present disclosure.

FIG. 14 is a block diagram of a configuration of a program module, according to an embodiment of the present disclosure.

According to an embodiment of the present disclosure, the program module 1410 (e.g., the program 140 of FIG. 3) may include an operating system (OS) controlling resources related to the electronic device 101 and/or various applications 147 driven on the operating system. The operating system may include, e.g., Android, iOS, Windows, Symbian, Tizen, or Bada.

The program 1410 includes a kernel 1420, middleware 1430, an application programming interface (API) 1460, and/or an application 1470. At least a part of the program module 1410 may be preloaded on the electronic device 101 or may be downloaded from the server 106.

The kernel 1420 (e.g., the kernel 141 of FIG. 3) includes a system resource manager 1421 and/or a device driver 1423.

The system resource manager 1421 performs control, allocation, or recovery of system resources. According to an embodiment of the present disclosure, the system resource manager 1421 may include a process managing unit, a memory managing unit, or a file system managing unit.

The device driver 1423 may include, for example, a display driver, a camera driver, a Bluetooth driver, a shared memory driver, a USB driver, a keypad driver, a Wi-Fi driver, an audio driver, or an inter-process communication (IPC) driver.

The middleware 1430 provides various functions to the application 1470 through the API 1460 so that the application 1470 may efficiently use limited system resources in the electronic device 101 or provide functions jointly required by applications 1470. According to an embodiment of the present disclosure, the middleware 1430 (e.g., middleware 143 of FIG. 3) may include at least one of a runtime library 1435, an application manager 1441, a window manager

1442, a multimedia manager 1443, a resource manager 1444, a power manager 1445, a database manager 1446, a package manager 1447, a connectivity manager 1448, a notification manager 1449, a location manager 1450, a graphic manager 1451, and a security manager 1452.

The runtime library 1435 includes a library module used by a compiler in order to add a new function through a programming language while the application 1470 is being executed. The runtime library 1435 performs input/output management, memory management, or operation on arithmetic functions.

The application manager 1441 manages the life cycle of at least one application of the applications 1470.

The window manager 1442 manages GUI resources used on the screen.

The multimedia manager 1443 determines formats necessary to play various media files and uses a codec appropriate for a format to perform encoding or decoding on media files.

The resource manager 1444 manages resources, such as source code of at least one of the applications 1470, memory or storage space.

The power manager 1445 operates together with a basic input/output system (BIOS) to manage battery or power and provide power information necessary for operating the electronic device.

The database manager 1446 generates, searches, or changes a database to be used in at least one of the applications 1470.

The package manager 1447 manages installation or update of an application that is distributed in the form of a package file.

The connectivity manager 1448 manages wireless connectivity, such as, WiFi or Bluetooth.

The notification manager 1449 displays or notifies a user of an event, such as an incoming message, an appointment, or a proximity notification, without interfering with the user.

The location manager 1450 manages location information on the electronic device 101.

The graphic manager 1451 manages graphic effects to be presented to the user and a related user interface.

The security manager 1452 provides various security functions necessary for system security or user authentication. According to an embodiment of the present disclosure, when the electronic device 101 has telephony capability, the middleware 1430 may further include a telephony manager for managing voice call or video call functions of the electronic device 101.

The middleware 1430 may include a middleware module forming a combination of various functions of the above-described components. The middleware 1630 provides a specified module for each type of operating system in order to provide a differentiated function. Further, the middleware 1430 may dynamically omit some existing components or add new components.

The API 1460 (e.g., the API 145 of FIG. 3) may be a set of API programming functions and may have different configurations depending on operating systems. For example, in the case of Android or iOS, one API set may be provided per platform, and in the case of Tizen, two or more API sets may be offered per platform.

The application 1470 includes one or more applications that provide functions such as, a home 1471, a dialer 1472, a short message service (SMS)/multimedia messaging service (MMS) 1473, an instant message (IM) 1474, a browser 1475, a camera 1476, an alarm 1477, a contact 1478, a voice dial 1479, an email 1680, a calendar 1481, a media player 1482, an album 1483, or a clock 1484. The application 1470 may additionally include a health-care application (e.g., for measuring the degree of workout or blood sugar), or environmental information application (e.g., for providing of air pressure, moisture, or temperature information).

According to an embodiment of the present disclosure, the application 1470 may include an information exchanging application for supporting information exchange between the electronic device 101 and an external electronic device such as, the first external electronic device 102 and the second external electronic device 104. Examples of the information exchange application may include, but is not limited to, a notification relay application for transferring specific information to the external electronic device, or a device management application for managing the external electronic device.

The notification relay application relays notification information generated from other applications 1470 of the electronic device 101 (e.g., the SMS/MMS application, email application, health-care application, or environmental information application) to the first external electronic device 102 and second external electronic device 104. Further, the notification relay application may receive notification information from, e.g., the first external electronic device 102 and second external electronic device 104 and provide the received notification information to the user.

The device management application performs at least some functions of the first external electronic device 102 or the second external electronic device 104 communicating with the electronic device 101 (for example, turning on/off the first external electronic device 102 or the second external electronic device 104 (or some components thereof) or controlling the brightness (or resolution) of the display). The device management application may additionally manage (e.g., install, delete, or update) an application operating in the external electronic devices or a service (e.g., call service or message service) provided from the external electronic devices.

According to an embodiment of the present disclosure, the application 1470 may include an application (e.g., a health-care application) designated depending on an attribute, such as the type of the external electronic devices. The application 1470 may include an application received from the external electronic devices or the server 106. The application 1470 may include a preloaded application or a third party application downloadable from the server 106. The names of the components of the program module 1410 according to the shown embodiment may be varied depending on the type of operating system.

According to an embodiment of the present disclosure, at least a part of the program module 1410 may be implemented in software, firmware, hardware, or in a combination of two or more thereof. At least a part of the programming module 1410 may be implemented (e.g., executed) by e.g., a processor (e.g., the AP 1310). At least a part of the program module 1410 may include e.g., a module, program, routine, set of instructions, process, etc. for performing one or more functions.

The term 'module' may refer to a unit including one of hardware, software, and firmware, or a combination thereof. The term 'module' may be interchangeably used with a unit, logic, logical block, component, or circuit. The module may be a minimum unit or part of an integrated component. The module may be a minimum unit or part of performing one or more functions. The module may be implemented mechanically or electronically. For example, the module may include at least one of Application Specific Integrated Circuit (ASIC) chips, Field Programmable Gate Arrays (FPGAs), or Programmable Logic Arrays (PLAs) that perform some operations, which are already known or will be developed in the future.

According to an embodiment of the present disclosure, at least a part of the electronic device (e.g., modules or their functions) or method (e.g., operations) may be implemented as instructions stored in a computer-readable storage medium in the form of a program module. The instructions, when executed by a processor (e.g., the processor 120 of FIG. 3), may enable the processor to carry out a corresponding function. The computer-readable storage medium may be the memory 130 of FIG. 3.

The computer-readable storage medium may include a hardware device, such as hard discs, floppy discs, and magnetic tapes (e.g., a magnetic tape), optical media such as compact disc read only memories (ROMs) (CD-ROMs) and digital versatile discs (DVDs), magneto-optical media such as floptical disks, ROMs, random access memories (RAMs), flash memories, etc. Examples of the program instructions may include not only machine language codes, but also high-level language codes which are executable by various computing means using an interpreter. The aforementioned hardware devices may be configured to operate as one or more software modules to carry out embodiments of the present disclosure, and vice versa.

Modules or programming modules in accordance with various embodiments of the present disclosure may include at least one or more of the aforementioned components, omit some of them, or further include other additional components. Operations performed by modules, programming modules or other components in accordance with various embodiments of the present disclosure may be carried out sequentially, simultaneously, repeatedly, or heuristically. Furthermore, some of the operations may be performed in a different order, or omitted, or include other additional operation(s).

As is apparent from the foregoing description, according to the present disclosure, there may be provided a method for displaying on a touchscreen a user interface that enables the user to manipulate the electronic device in a more comfortable manner depending on a relative relation between the position of a touch input made by the user on the touchscreen, a region adjacent to the touch input, or an adjacent position and an electronic device for the same.

The embodiments disclosed herein are proposed for description and understanding of the disclosed technology and do not limit the scope of the present disclosure. Accordingly, the scope of the present disclosure should be interpreted as including all changes or various embodiments based on the technical spirit of the present disclosure. Therefore, the scope of the present disclosure is defined not be the detailed description and embodiments, but by the following claims and their equivalents.

What is claimed is:

1. A method for displaying a user interface by an electronic device, the method comprising:
   receiving a touch input on a touchscreen of the electronic device;
   based on the received touch input, Detecting a region contacted by the received touch input on the touchscreen and an adjacent region adjacent to the contacted region, wherein the adjacent region includes a region of which a variation in capacitance occurs according to the received touch input;
   based on detecting the contacted region and the adjacent region, determining a point in the adjacent region as an origin of two coordinate axes, wherein the point determined as the origin represents a point with a minimum variation in the capacitance within the adjacent region;
   determining the two coordinate axes on the touch screen with respect to the origin, wherein the two coordinate axes defines four quadrants with respect to the origin;
   displaying a user input region at a position corresponding to the adjacent region;
   based on the user input region being displayed at the position deviated to a right on the touchscreen with respect to the origin, displaying the user interface on at least one quadrant deviated to a left with respect to the origin; and
   based on the user input region being displayed at the position deviated to the left on the touchscreen with respect to the origin, displaying the user interface on at least one quadrant deviated to the right with respect to the origin.

2. The method of claim 1, wherein the position deviated to the left with respect to the origin corresponds to a second quadrant or a third quadrant of the four quadrants.

3. The method of claim 1, wherein the position deviated to the right with respect to the origin corresponds to a first quadrant or a fourth quadrant of the four quadrants.

4. A method for displaying a user interface by an electronic device, the method comprising:
   detecting an adjacent region adjacent to where a portion of a user's body or an object is positioned on a touchscreen of the electronic device, wherein the adjacent region includes a region of which a variation in capacitance occurs according to the portion of the user's body or object;
   determining a point in the adjacent region as an origin of two coordinate axes, wherein the point determined as the origin represents a point with a minimum variation in the capacitance within the adjacent region;
   determining the two coordinate axes on the touchscreen with respect to the origin, wherein the two coordinate axes defines four quadrants with respect to the origin;
   displaying a user input region at a position corresponding to the adjacent region;
   based on the user input region being displayed at the position deviated to a right on the touchscreen with respect to the origin, displaying the user interface on at least one quadrant deviated to a left with respect to the origin; and
   based on the user input region being displayed at the position deviated to the left on the touchscreen with respect to the origin, displaying the user interface on at least one quadrant deviated to the right with respect to the origin.

5. The method of claim 4, wherein the position deviated to the left with respect to the origin corresponds to a second quadrant or a third quadrant of the plurality of quadrants.

6. The method of claim 4, wherein the position deviated to the right with respect to the origin corresponds to a first quadrant or a fourth quadrant of the plurality of quadrants.

7. An electronic device for displaying a user interface the electronic device comprising:
   a touchscreen; and
   a processor configured to:
   receive a touch input on the touchscreen, based on the received touch input, detect a region contacted by the received touch input on the touchscreen and an adjacent region adjacent to the contacted region wherein the adjacent region includes a region of which a variation in capacitance occurs according to the received touch input, based on detecting the contacted region and adjacent region, determine a point in the adjacent region as an origin of two coordinate axes, wherein the point determined as the origin represents a point with a minimum variation in the capacitance within the adjacent region;

determine the two coordinate axes on the touchscreen with respect to the origin, wherein the two coordinate axes defines four quadrants with respect to the origin, displaying a user input region at a position corresponding to the adjacent region;

based on the user input region being displayed at the position deviated to a right on the touchscreen with respect to the origin, displaying the user interface on at least one quadrant deviated to a left with respect to the origin; and based on the user input region being displayed at the position deviated to the left on the touchscreen with respect to the origin, displaying the user interface on at least one quadrant deviated to the right with respect to the origin.

8. The electronic device of claim 7, wherein the position deviated to the right with respect to the origin corresponds to a second quadrant or a third quadrant of the plurality of quadrants.

9. The electronic device of claim 7, wherein the position deviated to the right with respect to the origin corresponds to a first quadrant or a fourth quadrant of the plurality of quadrants.

* * * * *